United States Patent
Kennedy et al.

(10) Patent No.: US 12,325,208 B2
(45) Date of Patent: Jun. 10, 2025

(54) CORRUGATED THREE DIMENSIONAL (3D) ADDITIVE MANUFACTURING

(71) Applicant: Virginia Tech Intellectual Properties, Inc., Blacksburg, VA (US)

(72) Inventors: Brook Kennedy, Blacksburg, VA (US); Edward Olin Coe, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 1035 days.

(21) Appl. No.: 16/319,677

(22) PCT Filed: Jul. 6, 2017

(86) PCT No.: PCT/US2017/040873
§ 371 (c)(1),
(2) Date: Jan. 22, 2019

(87) PCT Pub. No.: WO2018/017330
PCT Pub. Date: Jan. 25, 2018

(65) Prior Publication Data
US 2021/0276244 A1      Sep. 9, 2021

Related U.S. Application Data

(60) Provisional application No. 62/365,597, filed on Jul. 22, 2016.

(51) Int. Cl.
*B31D 5/00* (2017.01)
*B22F 10/18* (2021.01)
(Continued)

(52) U.S. Cl.
CPC ............... *B31D 5/00* (2013.01); *B22F 10/18* (2021.01); *B29C 53/22* (2013.01); *B29C 64/118* (2017.08);
(Continued)

(58) Field of Classification Search
CPC ... B29C 64/118; B29C 64/386; B29C 64/393; B33Y 50/00; B33Y 50/02; B22F 10/00;
(Continued)

(56) References Cited

U.S. PATENT DOCUMENTS

| 6,441,338 B1 * | 8/2002 | Rabinovich ........... B23P 15/406 228/183 |
| 2003/0035917 A1 * | 2/2003 | Hyman .................... B41M 5/36 524/106 |

(Continued)

OTHER PUBLICATIONS

Debapriya Chakraborty, B. Aneesh Reddy, A. Roy Choudhury, Extruder path generation for Curved Layer Fused Deposition Modeling, Computer-Aided Design, vol. 40, Issue 2, 2008, pp. 235-243, https://doi.org/10.1016/j.cad.2007.10.014. (https://www.sciencedirect.com/science/article/pii/S0 (Year: 2008).*

(Continued)

*Primary Examiner* — Andrew L Swanson
(74) *Attorney, Agent, or Firm* — Carin R. Miller, Esq.; Johnson, Marcou, Isaacs & Nix, LLC

(57) ABSTRACT

In some aspects, described herein are methods of additive manufacturing in which one or more corrugated layers are (Continued)

incorporated into the three-dimensional (3D) object. Also provided herein are 3D objects that can include one or more corrugated layers.

18 Claims, 25 Drawing Sheets

(51) Int. Cl.
  *B29C 53/22* (2006.01)
  *B29C 64/118* (2017.01)
  *B32B 1/00* (2006.01)
  *B32B 3/30* (2006.01)
  B22F 10/28 (2021.01)
  *B33Y 10/00* (2015.01)
  *B33Y 80/00* (2015.01)

(52) U.S. Cl.
  CPC .................. *B32B 1/00* (2013.01); *B32B 3/30* (2013.01); *B22F 10/28* (2021.01); *B33Y 10/00* (2014.12); *B33Y 80/00* (2014.12)

(58) Field of Classification Search
  CPC .......... B22F 10/10; B22F 10/12; B22F 10/14; B22F 10/16; B22F 10/18; B22F 10/80; B22F 10/85
  See application file for complete search history.

(56) References Cited

U.S. PATENT DOCUMENTS

| | | |
|---|---|---|
| 2010/0003431 A1 | 1/2010 | Raybuck |
| 2013/0283700 A1 | 10/2013 | Bajaj et al. |
| 2014/0087147 A1 | 3/2014 | Shelby et al. |
| 2017/0217100 A1* | 8/2017 | Gardiner ............... B29C 64/209 |
| 2017/0225445 A1* | 8/2017 | Gardiner ............... B29C 64/106 |
| 2017/0274588 A1* | 9/2017 | Maué ........................ B32B 5/14 |
| 2018/0117219 A1* | 5/2018 | Yang ..................... B33Y 80/00 |

OTHER PUBLICATIONS

Jeff Hanson, Top Five Benefits of Additive Manufacturing (You Never Considered), Feb. 19, 2013, Manufacturing.net, https://www.manufacturing.net/home/article/13057041/top-five-benefits-of-additive-manufacturing-you-never-considered, p. 1-4 (Year: 2013).*

Pwnzor18, 10mm (1cm) Solid Test Cube, Aug. 30, 2015 (Accessed Apr. 22, 2024), Ultimaker Thingiverse, https://www.thingiverse.com/thing:991401 (Year: 2015).*

International Search Report for PCT/US2017/040873 of Sep. 14, 2017.

* cited by examiner

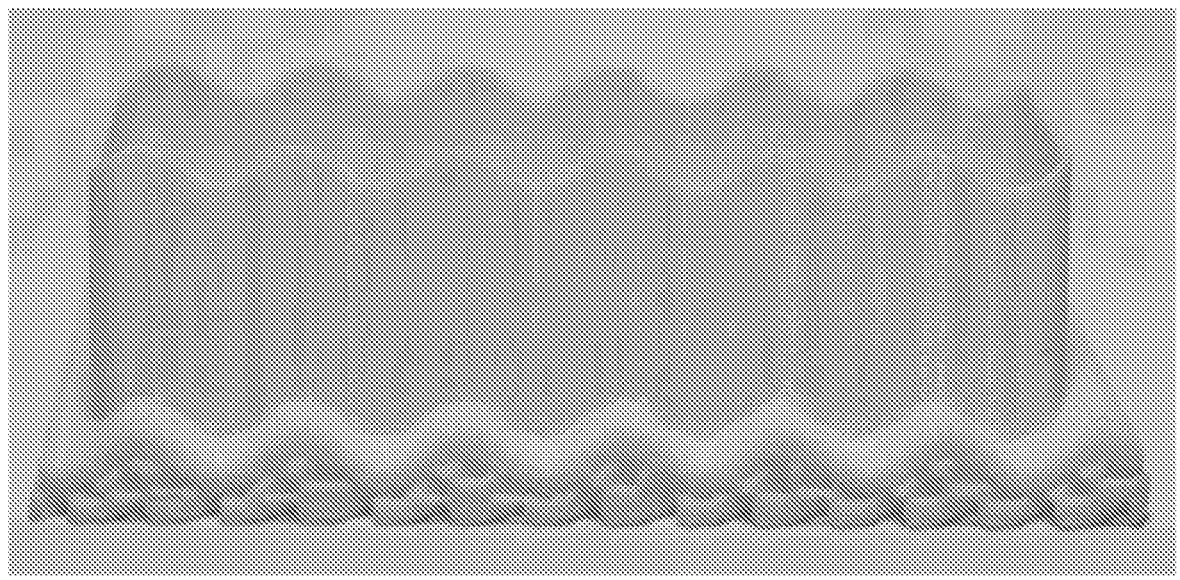
FIG. 19
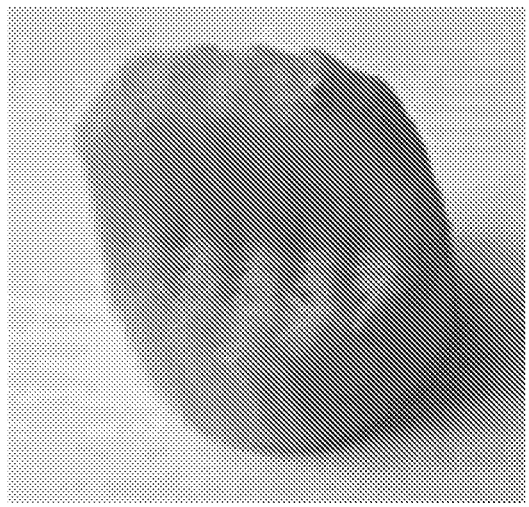 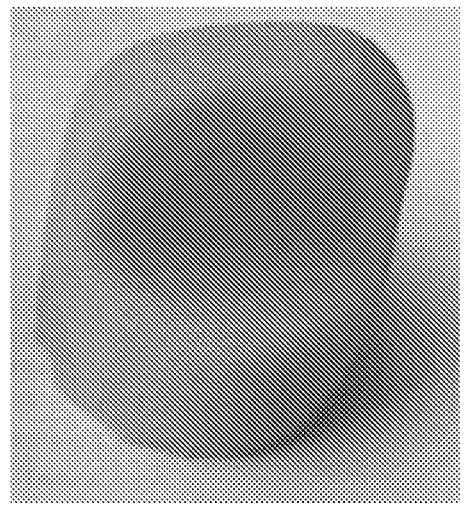
FIG. 20A  FIG. 20B

CORRUGATED THREE DIMENSIONAL (3D) ADDITIVE MANUFACTURING

CROSS-REFERENCE TO RELATED APPLICATIONS

This application is the 35 U.S.C. § 371 national stage application of PCT Application No. PCT/US2017/040873, filed Jul. 6, 2017, where the PCT claims priority to, and the benefit of, U.S. provisional application entitled "CORLAYER3D: CORRUGATED LAYERING FOR FDM 3D PRINTING," having Ser. No. 62/365,597, filed Jul. 22, 2016, both of which are herein incorporated by reference in their entireties.

BACKGROUND

Three-dimensional (3D) printing, also known as additive manufacturing, can generally refer to processes that can be used to produce 3D objects in which successive layers of material are formed under computer control to generate the 3D objects. Although in its relative infancy, 3D printing continues to evolve and new techniques and processes are needed to progress the technology and field.

SUMMARY

Described in some aspects herein are methods of additive manufacturing, the method including the steps of: forming a corrugated layer of material using a three-dimensional (3D) printer, wherein the corrugated layer can have a thickness, a length, a width, and a height, wherein the corrugated layer can have a cross-sectional area defined by the thickness and width at any given point along the length of the corrugated layer, and wherein the corrugated layer can vary in height along the length of the corrugated layer, and wherein the height of the corrugated layer at a position along the length of the corrugated layer is greater than the height of a planar layer that can be formed using the 3D printer having the same thickness and width as the corrugated layer. The cross-sectional area of the corrugated layer can be substantially constant along the length of the corrugated layer. The cross-sectional area of the corrugated layer can vary along the length of the corrugated layer. The height of the corrugated layer can be measured along the build direction of the 3D printer.

In some aspects the method can further include the step of forming a first transition layer of material using the 3D printer, wherein the first transition layer can have a thickness, a length, a width, and a height, wherein the first transition layer of material can have a cross-sectional area defined by the thickness and the width of the first transition layer at any given point along the length of the first transition layer, wherein the height of the first transition layer can vary along the length of the first transition layer, wherein the height of the first transition layer at a position along the length of the first transition layer can be greater than the height of a planar layer that can be formed using the 3D printer having the same thickness and width as the first transition layer, and wherein the height of the first transition layer can be less than the height of the corrugated layer when measured at the same position along the length of the first transition layer and the corrugated layer. The first transition layer can be adjacent to the corrugated layer.

In some aspects the method can further include the step of forming a second transition layer using the 3D printer, wherein the second transition layer can have a thickness, a length, a width, and a height, wherein the second transition layer of material can have a cross-sectional area defined by the thickness and the width of the second transition layer at any given point along the length of the second transition layer, wherein the height of the second transition layer can vary along the length of the second transition layer, wherein the height of the second transition layer at a position along the length of the second transition layer can be greater than the height of a planar layer that can be formed using the 3D printer having the same thickness and width as the second transition layer, wherein the height of the second transition layer can be less than the height of the corrugated layer when measured at the same position along the length of the first transition layer and the corrugated layer, and wherein the height of the second transition layer can be greater than the height of the first transition layer when measured at the same position along the length of the second transition layer and the first transition layer.

In some aspects, the first transition layer can be adjacent to the second transition layer. In some aspects, the second transition layer is adjacent to the corrugated layer.

In some aspects, the step of forming the first transition layer can include the step of depositing material on a corrugation form, wherein the corrugation form can have a height, length, width, and thickness, wherein the corrugation form can have a cross-sectional area defined by the width and thickness of the corrugation form, wherein the corrugation form can vary in height along the length of the corrugation form, and wherein the variation in height along the length of the corrugation form can be substantially the same as the variation in height along the length of the first transition layer.

In some aspects, the cross-sectional area of the first transition layer can be substantially constant along the length of the first transition layer.

In some aspects, the cross-sectional area of the first transition layer can vary along the length of the first transition layer.

In some aspects, the cross-sectional area of the second transition layer can be substantially constant along the length of the second transition layer.

In some aspects, the cross-sectional area of the second transition layer can vary along the length of the second transition layer.

In some aspects, first transition layer can be composed of planar layers. In some aspects, first second layer can be composed of planar layers.

In some aspects, the corrugation form can be composed of planar layers.

In some aspects, the corrugation form can be a non-laminate material.

In some aspects, the method of additive manufacturing can be fused filament fabrication.

Also described herein in some aspects is a three-dimensional laminate object having a corrugated layer produced via an additive manufacturing process that can include the steps of forming a corrugated layer of material using a three-dimensional (3D) printer, wherein the corrugated layer can have a thickness, a length, a width, and a height, wherein the corrugated layer can have a cross-sectional area defined by the thickness and width at any given point along the length of the corrugated layer, and wherein the corrugated layer can vary in height along the length of the corrugated layer, and wherein the height of the corrugated layer at least at one position along the length of the corrugated layer can be greater than the height of a planar layer that can be formed using the 3D printer having the same thickness and width as the corrugated layer. In some aspects the additive manufacturing process can further include the step of forming a first transition layer of material using the 3D printer, wherein the first transition layer can have a thickness, a length, a width, and a height, wherein the first transition layer of material can have a cross-sectional area defined by the thickness and the width of the first transition layer at any given point along the length of the first transition layer, wherein the height of the first transition layer can vary along the length of the first transition layer, wherein the height of the first transition layer at least at one position along the length of the first transition layer can be greater than the height of a planar layer that can be formed using the 3D printer having the same thickness and width as the first transition layer, and wherein the height of the first transition layer can be less than the height of the corrugated layer when measured at the same position along the length of the first transition layer and the corrugated layer. In some aspects, the first transition layer can be adjacent to the corrugated layer.

In some aspects, the additive manufacturing process can further include the step of forming a second transition layer using the 3D printer, wherein the second transition layer can have a thickness, a length, a width, and a height, wherein the second transition layer of material can have a cross-sectional area defined by the thickness and the width of the second transition layer at any given point along the length of the second transition layer, wherein the height of the second transition layer varies along the length of the second transition layer, wherein the height of the second transition layer at a position along the length of the second transition layer can be greater than the height of a planar layer that can be formed using the 3D printer having the same thickness and width as the second transition layer, wherein the height of the second transition layer can be less than the height of the corrugated layer when measured at the same position along the length of the first transition layer and the corrugated layer, and wherein the height of the second transition layer can be greater than the height of the first transition layer when measured at the same position along the length of the second transition layer and the first transition layer. In some aspects, the first transition layer can be adjacent to the second transition layer. In some aspects, the second transition layer can be adjacent to the corrugated layer. In some aspects, the method of additive manufacturing can be fused filament fabrication.

Also described herein in some aspects are methods of additive manufacturing, that can include the steps of forming a first corrugated layer of material using a three-dimensional (3D) printer, wherein the first corrugated layer can have a thickness, a length, a width, and a height, wherein the first corrugated layer has a cross-sectional area defined by the thickness and width at any given point along the length of the first corrugated layer, wherein the first corrugated layer can vary in height along the length of the corrugated layer, and wherein the height of the corrugated layer at a position along the length of the corrugated layer can be greater than the height of a planar layer that can be formed using the 3D printer having the same thickness and width as the corrugated layer.

Also described herein in some aspects are method of additive manufacturing that can include the steps of forming a first corrugated layer of material using a three-dimensional (3D) printer, wherein the first corrugated layer can have a thickness, a length, a width, and a height, wherein the first corrugated layer can have a cross-sectional area defined by the thickness and width at any given point along the length of the first corrugated layer, and wherein the first corrugated layer can vary in height along the length of the first corrugated layer, and wherein the height of the first corrugated layer at a position along the length of the first corrugated layer can be greater than the height of a planar layer that can be formed using the 3D printer having the same thickness and width as the first corrugated layer; forming a first transition layer of material using the 3D printer, wherein the first transition layer can have a thickness, a length, a width, and a height, wherein the first transition layer of material can have a cross-sectional area defined by the thickness and the width of the first transition layer at any given point along the length of the first transition layer, wherein the height of the first transition layer of material can be less than the height of the first corrugated layer when measured at the same position along the length of the first transition layer and the first corrugated layer, forming a second corrugated layer of material using the 3D printer, wherein the second corrugated layer can have a thickness, a length, a width, and a height, wherein the second corrugated layer can have a cross-sectional area defined by the thickness and width at any given point along the length of the second corrugated layer, and second corrugated layer can vary in height along the length of the second corrugated layer, and wherein the height of the second corrugated layer at a position along the length of the second corrugated layer can be greater than the height of a planar layer that can be formed using the 3D printer having the same thickness and width as the second corrugated layer, wherein the first transition layer can be between the first corrugated layer and the second corrugated layer. In some aspects, the first transition layer can be adjacent to the first corrugated layer. In some aspects, the first transition layer can be adjacent to the second corrugated layer. In some aspects the method can further include the step of forming a second transition layer of material, wherein the second transition using the 3D printer, wherein the second transition layer can have a thickness, a length, a width, and a height, wherein the second transition layer of material can have a cross-sectional area defined by the thickness and the width of the second transition layer at any given point along the length of the second transition layer, wherein the height of the second transition layer of material can be less than the height of the first corrugated layer or the second corrugated layer when measured at the same position along the length of the first transition layer and the first corrugated layer or the second corrugated layer. In some aspects, the second transition layer can be between the first corrugated layer and the second corrugated layer. In some aspects, the second transition layer can be adjacent to the first transition layer. In some aspects, the second transition layer can be adjacent to the first corrugated layer. In some aspects the second transition layer is adjacent to the second corrugated layer. In some aspects, the second transition layer is not between the first corrugated layer and the second corrugated layer. In some of these aspects, the second transition layer can be adjacent to the first corrugated layer. The second transition layer is adjacent to the second corrugated layer. In some aspects, the method can further include the step of forming a planar layer. In some aspects, the first transition layer and the second transition layer can be between the first corrugated layer and the second corrugated layer and wherein the planar layer can be between the first transition layer and the second transition layer.

Also described herein in some aspects are methods of additive manufacturing that can include the steps of forming a first corrugated layer of material using a three-dimensional (3D) printer, wherein the first corrugated layer can have a thickness, a length extending along a first axis, a width, and a height, wherein the first corrugated layer can have a cross-sectional area defined by the thickness and width at any given point along the length of the first corrugated layer, wherein the first corrugated layer can vary in height along the length of the corrugated layer, and wherein the height of the corrugated layer at a position along the length of the first corrugated layer can be greater than the height of a planar layer that can be formed using the 3D printer having the same thickness and width as the first corrugated layer; and forming a second corrugated layer of material using the 3D printer, wherein the second corrugated layer can have a thickness, a length extending along a second axis, a width, and a height, wherein the second corrugated layer has a cross-sectional area defined by the thickness and width at any given point along the length of the first corrugated layer, wherein the second corrugated layer can vary in height along the length of the second corrugated layer, and wherein the height of the second corrugated layer at a position along the length of the second corrugated layer is greater than the height of a planar layer that can be formed using the 3D printer having the same thickness and width as the second corrugated layer, and wherein the first corrugated layer can be adjacent to second corrugated layer. In some aspects, the method can further include the step of forming a first transition layer of material using the 3D printer, wherein the first transition layer can have a thickness, a length, a width, and a height, wherein the first transition layer of material can have a cross-sectional area defined by the thickness and the width of the first transition layer at any given point along the length of the first transition layer, wherein the height of the first transition layer of material can be less than the height of the first corrugated layer, second corrugated layer, or the first corrugated layer and the second corrugated layer when measured at the same position along the length of the first transition layer and the first corrugated layer, the second corrugated layer, or the first corrugated layer and the second corrugated layer, wherein the first transition layer is adjacent to the first corrugated layer or the second corrugated layer.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 19 shows an image of a 3D object having one or more corrugated layers still attached to a corrugation form and printing support.

FIGS. 20A-20B show images of 3D objects with (FIG. 20A) and without (FIG. 20B) corrugated layers. The 3D object shown in FIG. 18B only contains conventional planar layers.

DETAILED DESCRIPTION

Figure 1A:
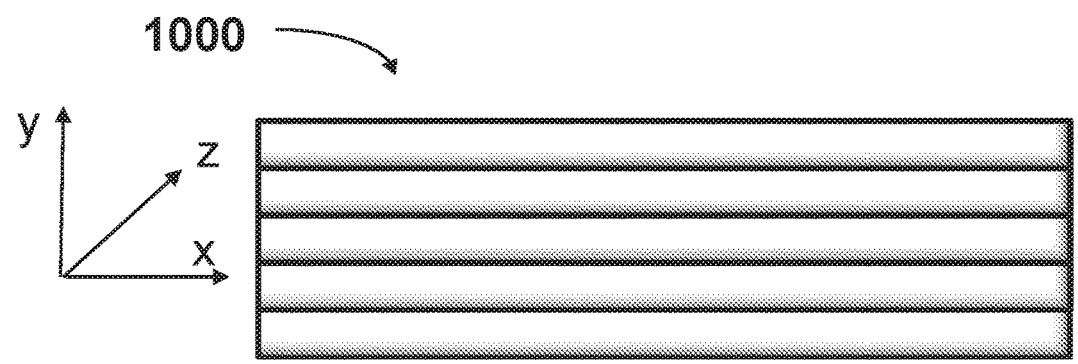
FIGS. 1A and 1B show a conventional 3D printed object constructed completely of planar layers (FIG. 1A) and the effect of shear forces on conventional planar layers (FIG. 1B).

Before the present disclosure is described in greater detail, it is to be understood that this disclosure is not limited to particular embodiments described, and as such may vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed. As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of mechanical engineering, software engineering, electrical engineering, and 3D-printing and manufacturing. Such techniques are explained fully in the literature.

Definitions

As used herein, "about," "approximately," and the like, when used in connection with a numerical variable, generally refers to the value of the variable and to all values of the variable that are within the experimental error (e.g., within the 95% confidence interval for the mean) or within +/−10% of the indicated value, whichever is greater.

As used herein, the phrase "area of corrugated layers" can refer to two or more corrugated layers within a physical object, such as a 3D printed object. The corrugated area(s) may or may not be separated from other corrugated area(s) by one or more transition layers and/or planar layers.

As used herein, "corrugated layer" can refer to a single layer of material that can have one or more features that can extend in at least 2 axes, and in some aspects 3 axes, beyond just the dimensions of the material forming the layer, which distinguishes corrugated layers from conventional planar layers, such as those deposited or otherwise generated during conventional additive manufacturing techniques.

As used herein, "planar layer" can refer a layer of printing or other material that is essentially two dimensional with reference to a 3D object and can have a length along one axis and a width along a second axis that is equal to the thickness of the printing or other material that forms the layer. Layers produced by conventional 3D printers are planar layers.

As used herein, "build direction" can refer to the direction along an axis in which the layers of a 3D printed object are built up on one another. It will be appreciated that the build direction can be any axis (x, y, or z).

DISCUSSION 3D printing is the manufacturing process of taking a digital design of a physical object and generating the physical object. There are various 3D printing technologies, but all are based on the same principle of operation: a digital design or model is used as a template to generate a solid 3D physical object layer by layer by adding and/or subtracting material to each layer. Types of 3D printing technologies include Fused Deposition Modeling™ (FDM™) technology (also known in the art as fused filament fabrication (FFF)), sterolithography (SLA), digital light processing (DLP), selective laser sintering (SLS), material jetting (including PolyJet and MultiJet Modeling), binder jetting, and 3D metal printing processes (including selective laser melting and electron beam melting).

Figure 1B:
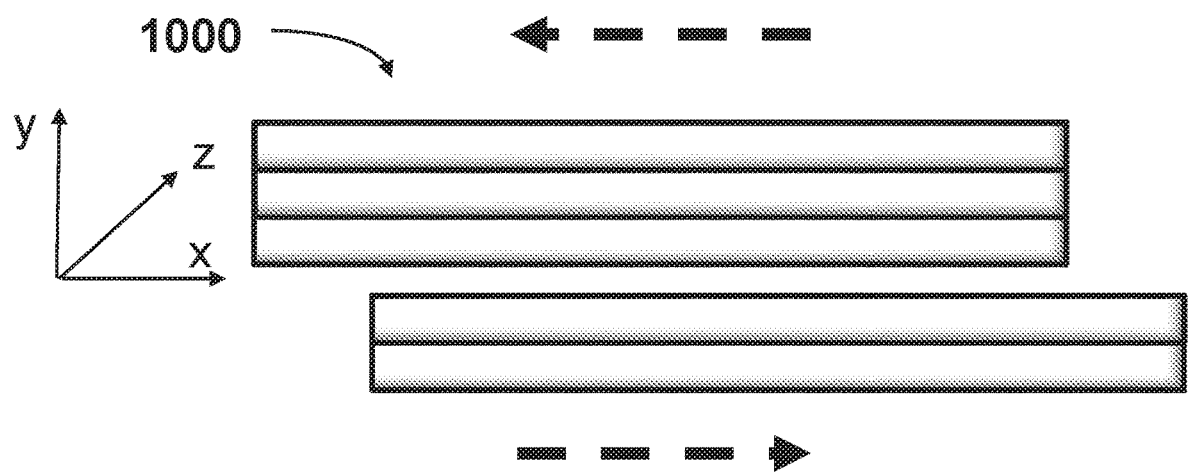

As a 3D printer generates the physical object layer by layer, the digital design of the physical object is digitally "sliced" to generate instructions for printing each layer. These instructions are used by the 3D printer to generate each layer of the object. Current technologies generate planar layers that are essentially two-dimensional (2D) and exist in a single plane, with the third dimension being determined by the thickness of the material forming each layer (see, e.g. FIG. 1A). Thus, the printed 3D physical object is a laminate formed of the multiple essentially 2D planar printed layers that have been bonded or otherwise attached together (see e.g. FIG. 1A). This planar laminate construction generates an inherent structural weakness in 3D printed objects. As shown in FIG. 1B, shear forces (dashed arrows) that can be applied to the 3D printed object in, for example, the x plane and/or z plane, can result in failure of the 3D printed object at the junction between layers. In other words, a 3D printed object can be inherently prone to structural failure due to the planar laminate design. Altering the orientation of the various layers to avoid layering along one particular axis has been used to avoid layering along axes that will be subjected to shear forces during use of the printed object. However, this can still leave the product weak in a different axis than the one accounted for and thus is still susceptible to structural failure due to shear forces.

With at least this limitation of current 3D printing techniques in mind, described herein are 3D printing methods and techniques that include generating a first corrugated layer of material and generating a second corrugated layer of material and attaching the first corrugated layer of material to the second corrugated layer of material to form a 3D physical object. Also described herein are physical objects that can include one or more corrugated layers. In some aspects, the physical objects that can include one or more corrugated layers can be manufactured by a method described herein. The corrugated layers can, in some aspects, provide resistance to a shear force applied to the physical object and can increase the structural strength of the physical object as at least compared to physical objects containing only planar layers. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Figure 2:
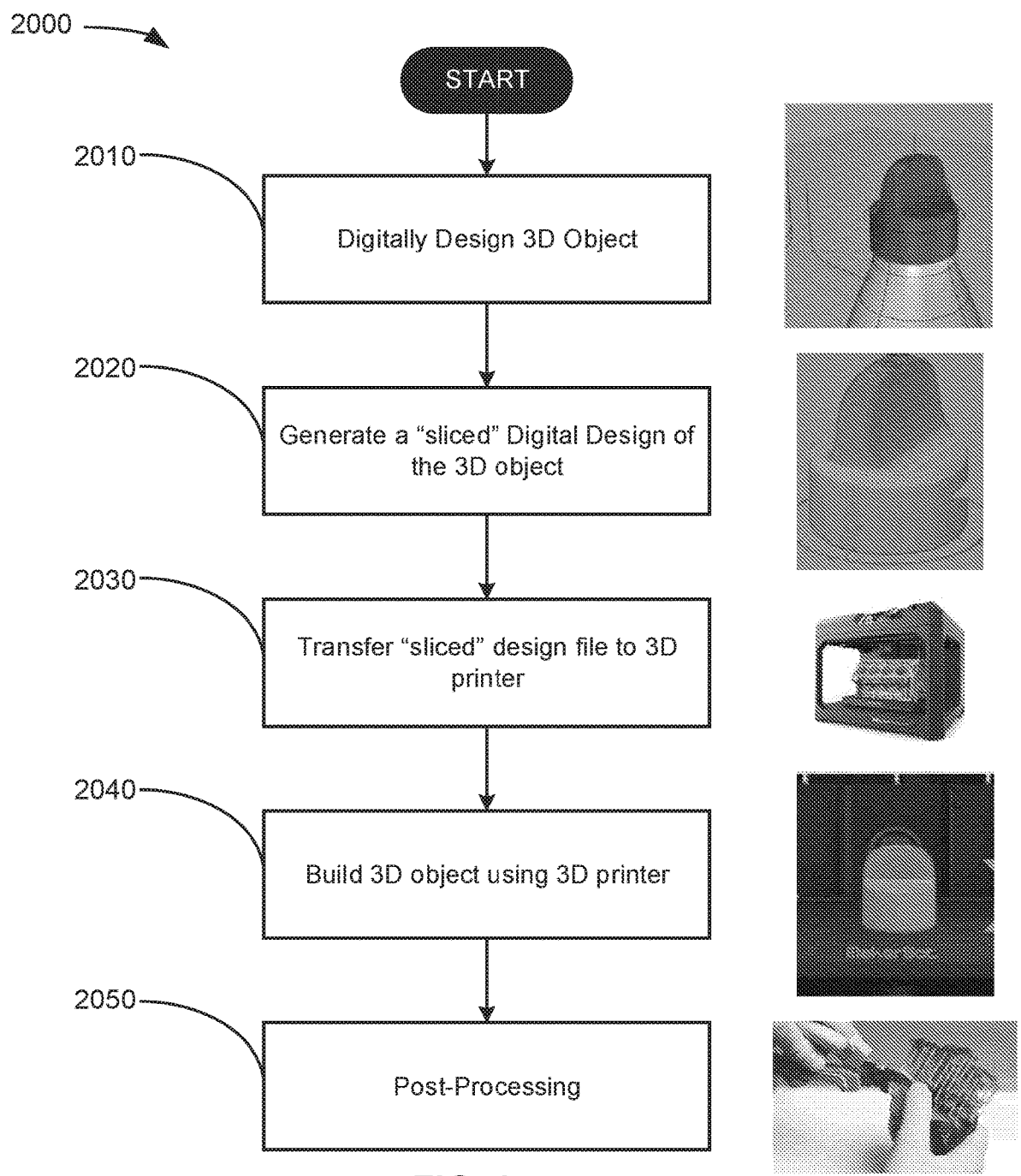
FIG. 2 shows a flow chart demonstrating aspects of a method of generating a 3D object with one or more corrugated layers via 3D printing.

With this general description in mind, attention is directed to FIG. 2, which shows a general method of 3D printing an object having one or more corrugated layers. The method 2000 can start with digitally designing a 3D object 2010. After digitally designing the 3D object 2010, the method can continue with generating a "sliced" digital design of the 3D object from the digitally designed 3D object 2020. Each slice in the sliced digital design of the 3D object corresponds to one printed layer. One or more of these slices can include one or more corrugated layers. This is described in greater detail below. After the sliced digital design of the 3D object is generated, the sliced digital design can be transferred to 2030 and/or used by a 3D printer to build the designed 3D object layer by layer. In some aspects, after the designed 3D object that can have a corrugated layer is built 2040, one or more post-processing steps can be performed 2050, such as removal of a support structure used during printing, sanding, painting, and/or utilizing other finishing techniques described herein or will be appreciated by one of ordinary skill in the art.

Figure 3:
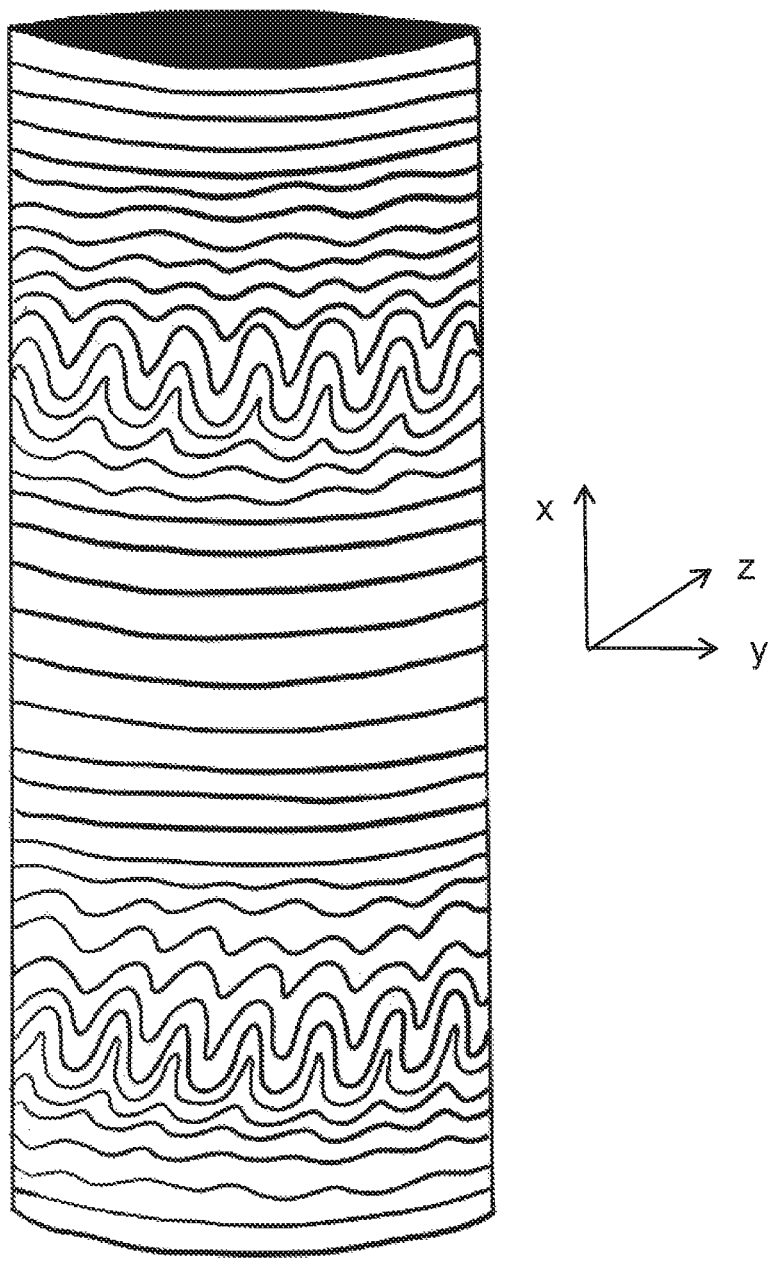
FIG. 3 shows a 3D object having one or more corrugated layer.

With the general 3D printing process in mind, attention is directed to FIGS. 3-15F, which demonstrate aspects of a method of 3D printing an object that can include one or more corrugated layers and 3D objects that can include one or more corrugated layers. As shown in FIG. 3, the method can produce a 3D object with one or more corrugated layers. In some aspects, the 3D object can contain one or more areas of corrugated layers and one or more areas of planar layers. The areas of corrugated layers can be separated from the planar layers by one or more transition layers, which can gradually introduce corrugated layers into the 3D printed object. In some aspects, transition layers are not included to separate at least one corrugated layer area from a planar layer. In some aspects, the corrugated layer can form the outermost layer of the 3D object. By way of example only and designating the y-axis as the build direction, there can be one or more areas of corrugated layers along the y-axis and/or z-axis. Other configurations will be appreciated by the skilled artisan in view of this disclosures and are within the scope of this disclosure.

Figure 4:
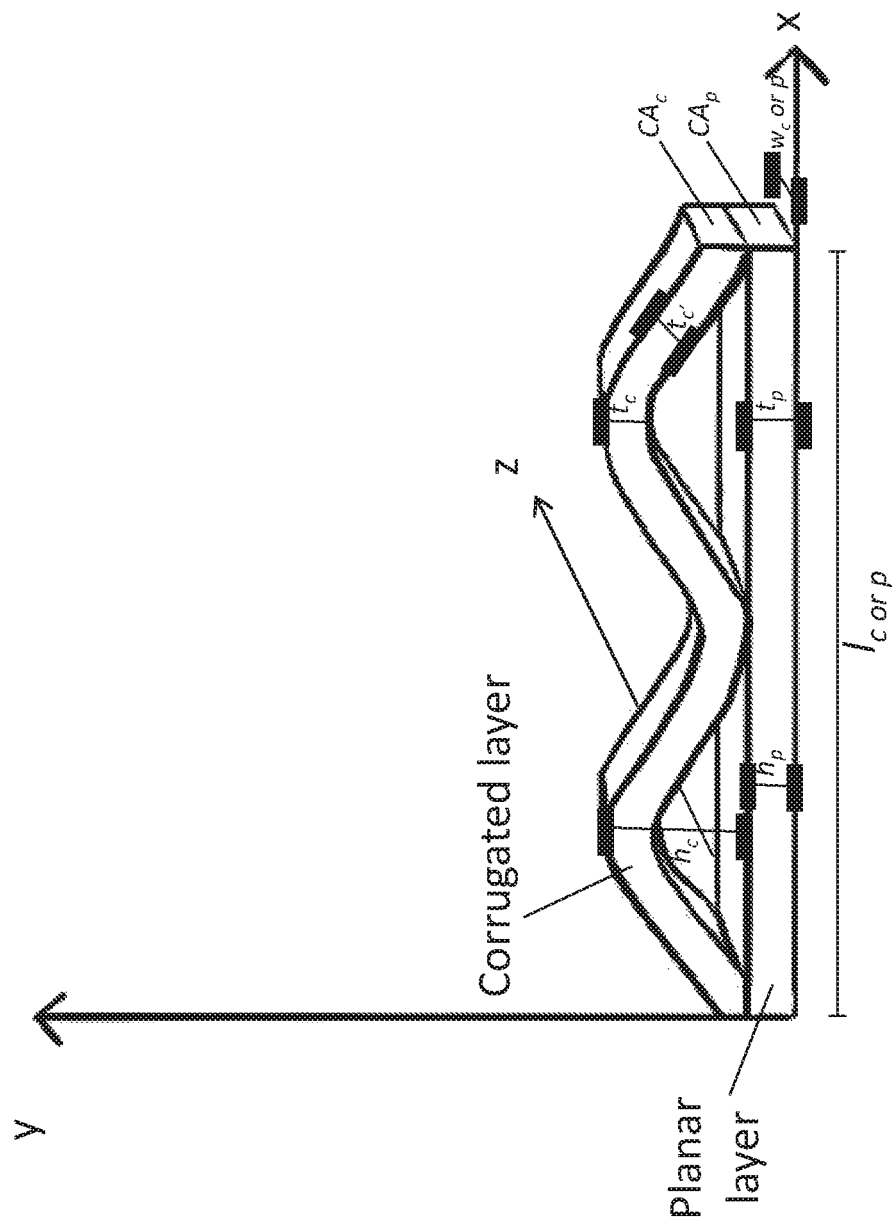
FIG. 4 shows aspects of a corrugated layer in comparison to a planar layer.

As shown in FIG. 4, a corrugated layer can be defined by and distinguished from a planar layer that can be produced using a method of additive manufacturing. The corrugated layer can be made of a material, such as a suitable printing material, and can have a thickness ($t_c$), length ($l_c$), width ($w_c$), and height ($h_c$). The corrugated layer can also have a cross-sectional area ($CA_c$). The $CA_c$ can be defined by the $t_c$ and the $w_c$. The $CA_c$ can be measured at any point along the length of the corrugated layer. In some aspects, CAc can be substantially constant along the length of the corrugated layer. In some aspects, CAc can vary along the length of the corrugated layer. The width of the corrugated layer can be substantially the same along its length. The width of the corrugated layer can be varied along its length. The thickness of the corrugated layer can be substantially the same along its length. The thickness of the corrugated layer can be varied along its length.

Figure 26A:
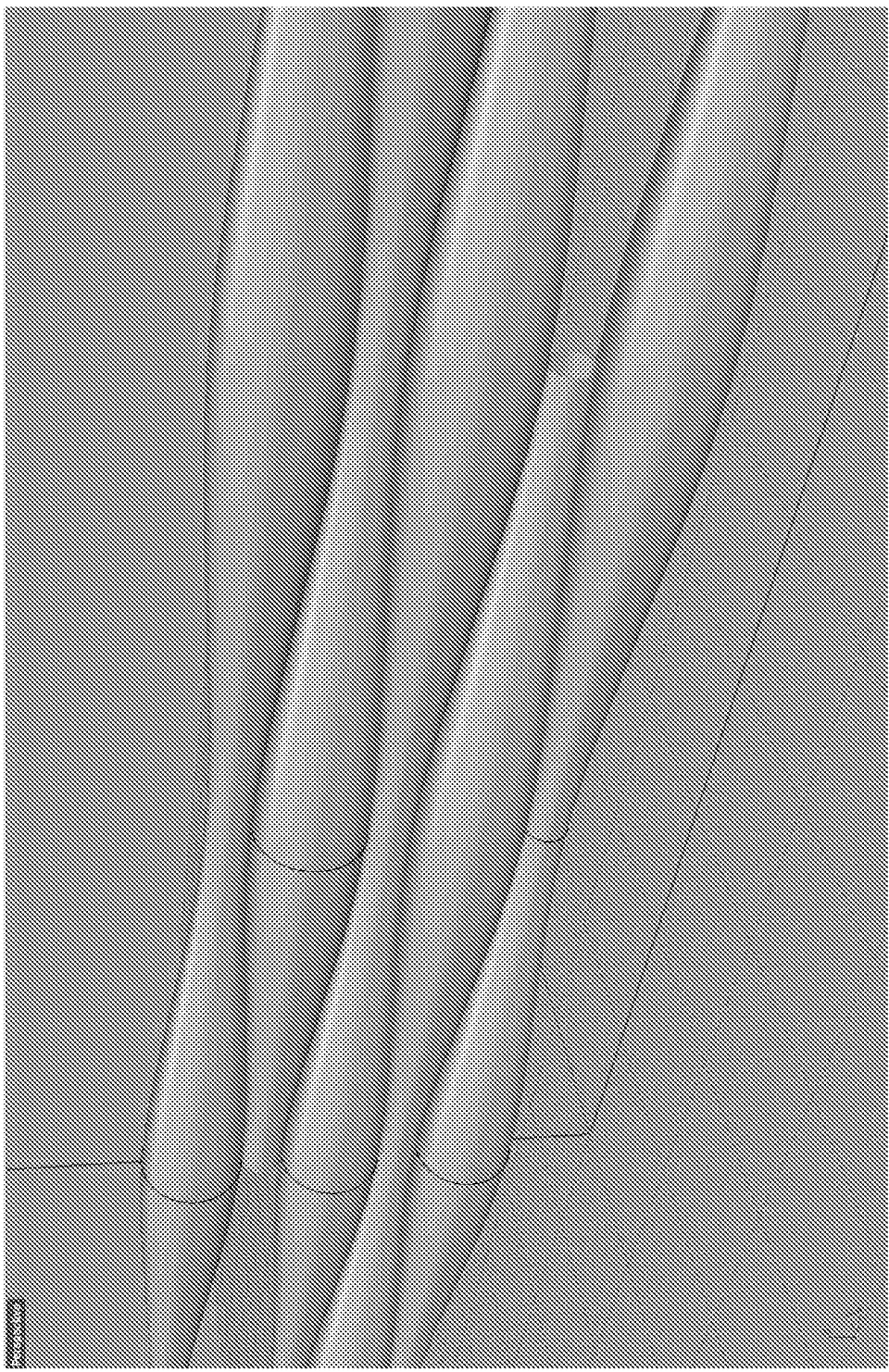
FIGS. 26A-26B show a close-up image (FIG. 26A) of another embodiment of the corrugated layers that can be varied in their width and/or height along their length, which can be stacked such that the larger portions of one corrugated layer can be placed adjacent to the smaller regions of second corrugated layer (FIG. 26B).
Figure 26B:
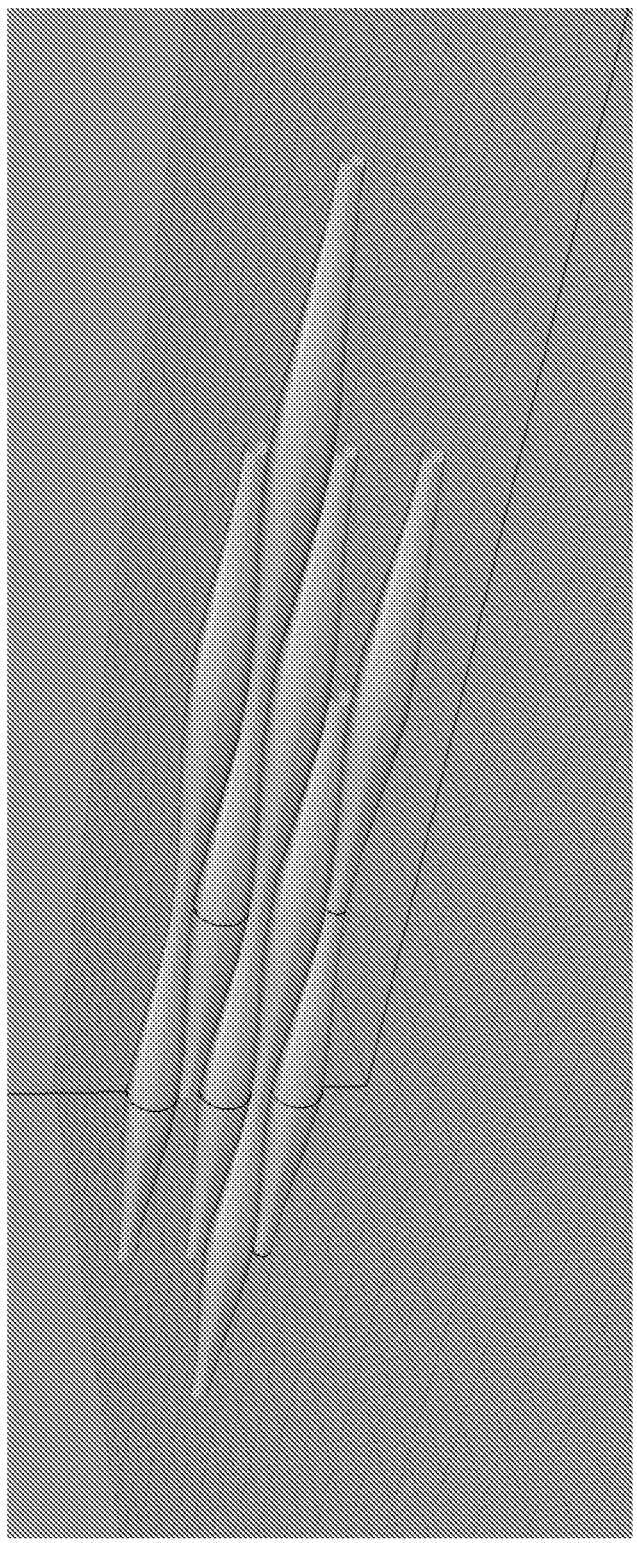

FIGS. 26A-26B show a close-up image (FIG. 26A) of another embodiment of the corrugated layers that can be varied in their width and/or height along their length, which can be stacked such that the larger portions of one corrugated layer can be placed adjacent to the smaller regions of second corrugated layer (FIG. 26B). In these embodiments, the cross-sectional area is varied along the length of the corrugated layers to form "bulges" in the corrugated layers.

Also as shown in FIG. 4, a planar layer can have a thickness ($t_p$), a length ($l_p$), a width ($w_p$), and a height ($h_p$). The planar layer can also have a cross-sectional area ($CA_p$). The $CA_p$ can be defined by the $t_p$ and the $w_p$. The $CA_p$ can be measured at any point along the length of the corrugated layer. In the planar layer, when produced by a 3D printer, the $w_p=h_p=t_p$. In short, the material used to print the planar layer sets forth the width, height, and thickness of the planar layer.

Unlike a planar layer, a corrugated layer can vary in height along the length of the corrugated layer. The height of the corrugated layer is not restricted by the material used to print the corrugated layer. As shown in FIG. 4, $h_c$ is greater than $h_p$ when measured at least at a point along the length of the corrugated layer and same point along the length of a planar layer that can be formed using a 3D printer and can have the same thickness and width as the corrugated layer. It will be appreciated that height can be measured along the build direction of the 3D printer.

Figure 5:
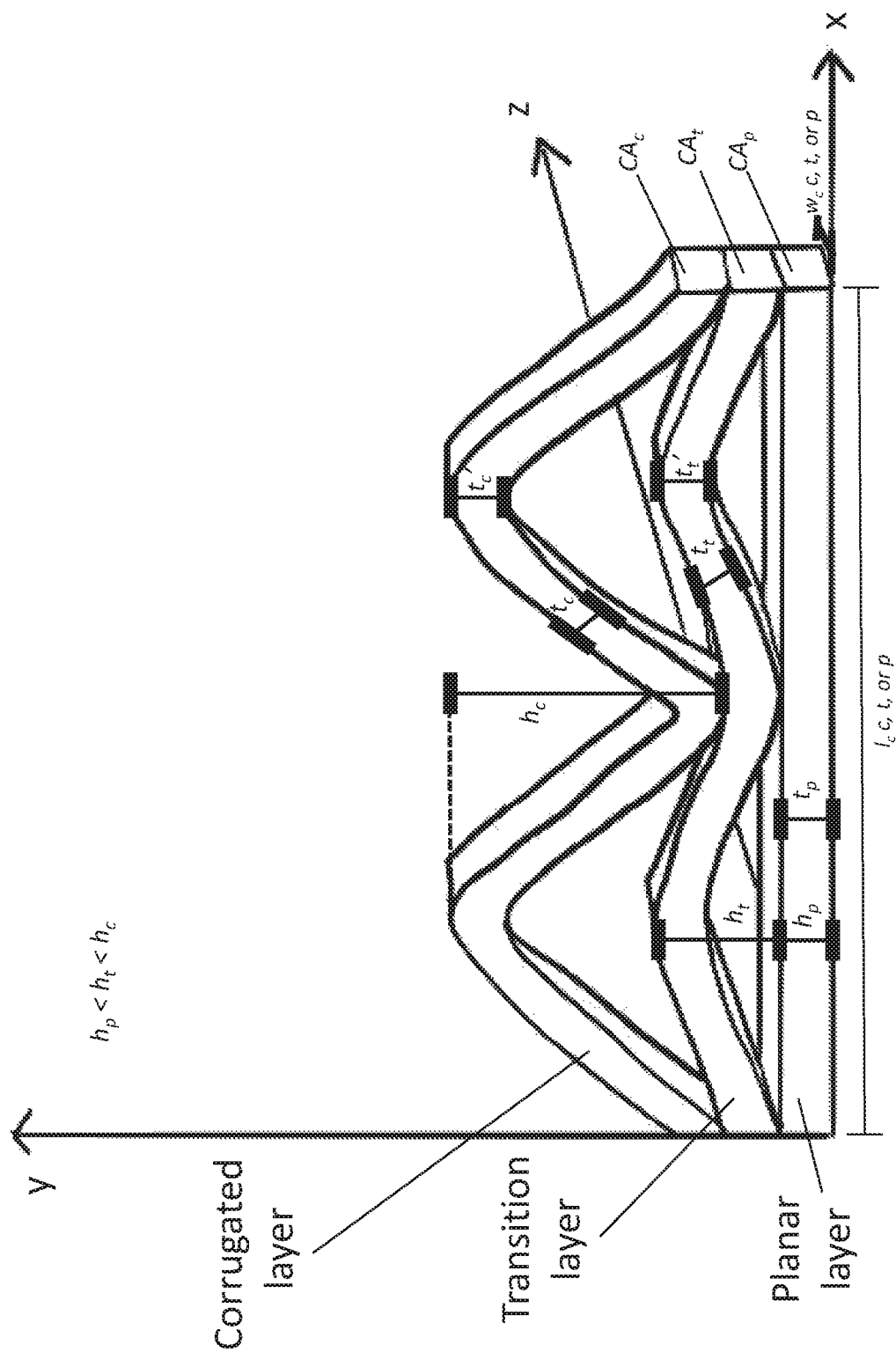
FIG. 5 shows aspects of a corrugated layer in comparison to a transition layer and a planar layer.

As shown in FIG. 5, one or more transition layers can be included to gradually introduce the corrugated layer, which has the desired endpoint corrugation characteristics. A transition layer can have a thickness ($t_t$), length ($l_t$), width ($w_t$), and height ($h_t$). A transition layer can have a cross-sectional area ($CA_t$). The $CA_t$ can be measured at any point along the length of the corrugated layer. In some aspects, CAt can be substantially constant along the length of the corrugated layer. In some aspects, CAt can vary along the length of the corrugated layer.

Like a corrugated layer, the height of the transition layer at least at one point along the length of the transition layer is greater than the height of a planar layer that can be formed using a 3D printer and having the same thickness and width as the transition layer. However, a transition layer can be distinguished from a corrugated layer in that the height of the first transition layer at least at one point along the length of the first transition layer is less than the height of the corrugated layer when measured at the same position along the length of the first transition layer and the length of the corrugated layer. In other words, $h_c > h_t > h_p$.

In some aspects, $CA_t$ can be substantially the same as $CA_c$, which can be substantially the same as $CA_p$. In some aspects, $CA_t$ can be substantially the same as $CA_c$. In some aspects, $CA_t$ can be substantially the same as $CA_p$. In some aspects, $CA_c$ can be substantially the same as $CA_p$. In some aspects, $CA_t$ can be different than $CA_c$, which can be different than $CA_p$. In some aspects, $CA_t$ can be different than $CA_c$. In some aspects, $CA_t$ can be different than $CA_p$. In some aspects, $CA_c$ can be different than $CA_p$. In some aspects where $CA_t$ can be substantially the same as $CA_c$, $CA_p$ can be different from $CA_c$ and $CA_t$. In some aspects where $CA_t$ can be substantially the same as $CA_p$, $CA_c$ can be different from $CA_p$ and $CA_t$. In some aspects where $CA_p$ can be substantially the same as $CA_c$, $CA_t$ can be different from $CA_p$ and $CA_c$.

Where more than one transition layer is present, two transition layers can be distinguished from one another. Each transition layer, as discussed above, can have a thickness ($t_t$), length ($l_t$), width ($w_t$), and height ($h_t$). The height of each transition layer can vary along its length. When compared to each other, the height of the first transition layer can be different from (greater than or less than) the height of the second transition layer when measured at the same point along the length of the first and the second transition layer. The arrangement of these transition layers that vary in heights as compared to each other can allow for the gradual introduction and removal of corrugated layer(s) in an object. This is further illustrated as described elsewhere herein. As described above, each transition layer can have a cross-sectional area. The cross-sectional areas of the first transition layer can be substantially the same as the cross-sectional area of the second transition layer when measured at the same point along the length of the first and the second transition layer. The cross-sectional areas of the first transition layer can be different (greater or less) than the cross-sectional area of the second transition layer when measured at the same point along the length of the first and the second transition layer. The cross-sectional area of the first transition layer can be substantially the same along the length of the first transition layer. The cross-sectional area of the second transition layer can be substantially the same along the length of the second transition layer. The cross-sectional area of the first transition layer can be varied along the length of the first transition layer. The cross-sectional area of the second transition layer can be varied along the length of the second transition layer. While only two transition layers are discussed here, it will be appreciated that more than two transition layers can be present in the objects produced using the methods described herein.

Figure 6:
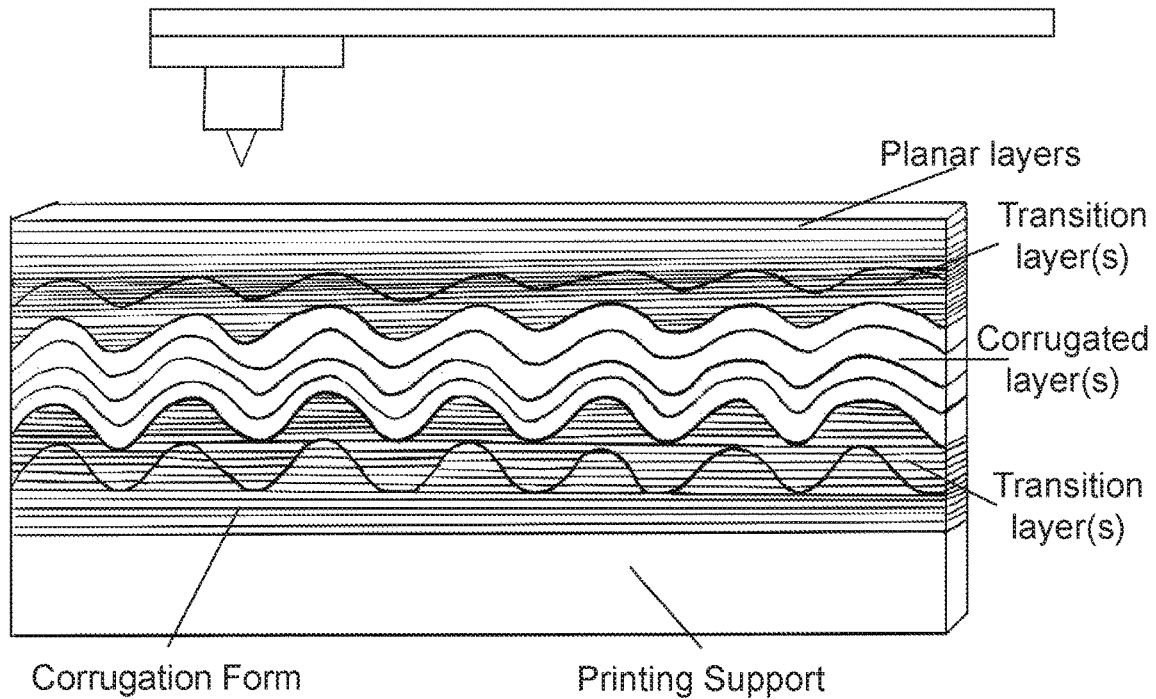
FIG. 6 shows a section of an embodiment of a 3D object having one or more corrugated layer.
Figure 7:
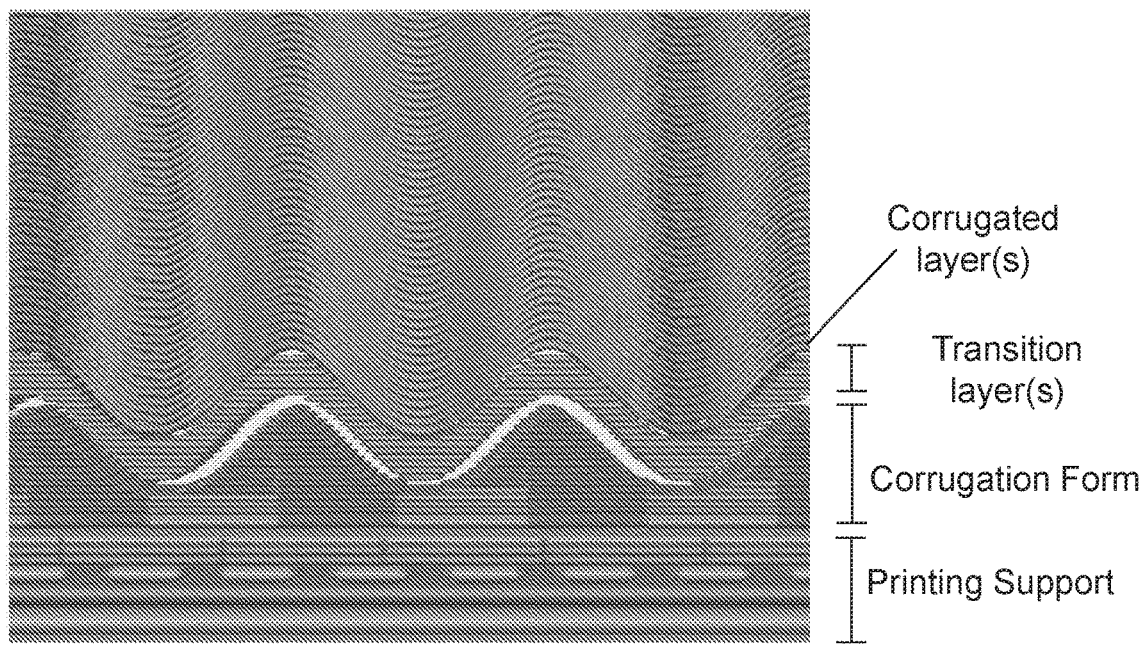
FIG. 7 shows another view of a section of an embodiment of a 3D object having one or more corrugated layers.

In some aspects and as shown in FIGS. 6-7, a 3D printer can generate corrugated layers on top of a printing support, corrugation form, and transition layer(s). As shown in FIGS. 6-7, a corrugation form can be formed on top of a printing support, planar layers can be formed on top of the printing support. In some aspects, the planar layers can include breaks in the printing material along an axis that is not axis of the build direction (e.g. the x-axis for FIGS. 6-7) With each subsequent layer along the build direction axis (e.g. the y-axis for FIGS. 6-7), the break(s) in the printing material can become greater to produce the corrugation form that can contain features. The features can form any shape and can extend along one or more axes that is(are) not the axis along which the layer extends (also referred to herein as the secondary axis and tertiary axis and is discussed in greater detail below). As shown in FIGS. 6-7, the features of the corrugated form (and/or layer) can extend along the y-axis. Stated differently, the features of the corrugated layer can be two dimensional (existing in a single plane, e.g. x,y plane as shown in FIGS. 6-7) or three dimensional. The features are discussed in greater detail with reference to e.g., FIGS. 15A-15F.

Figure 8:
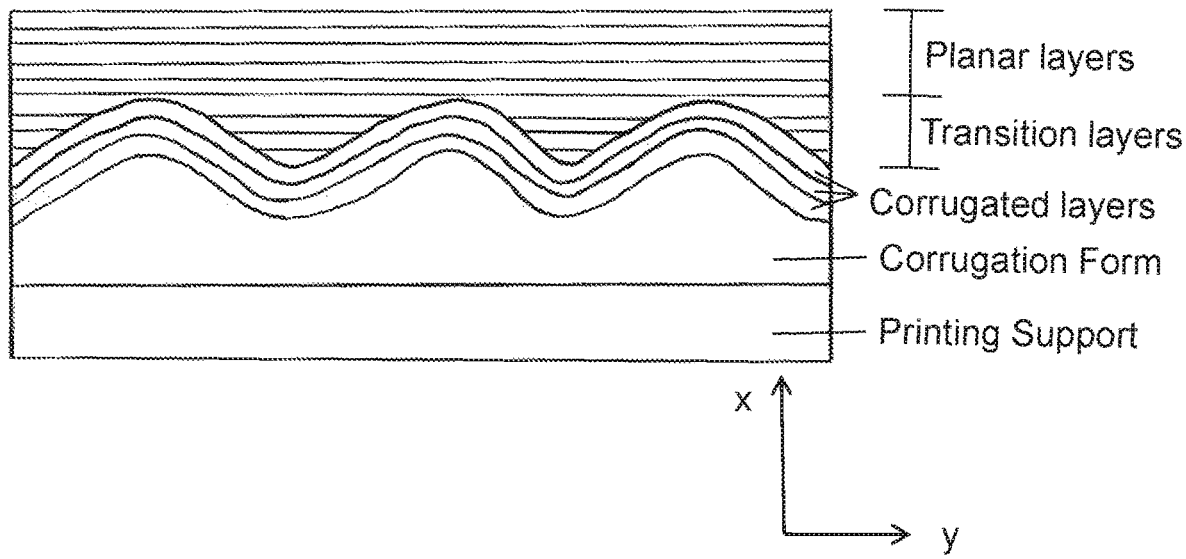
FIG. 8 shows a 2D view of the x, y plane of a section of an embodiment of a 3D object having or more corrugated layers.
Figure 27:
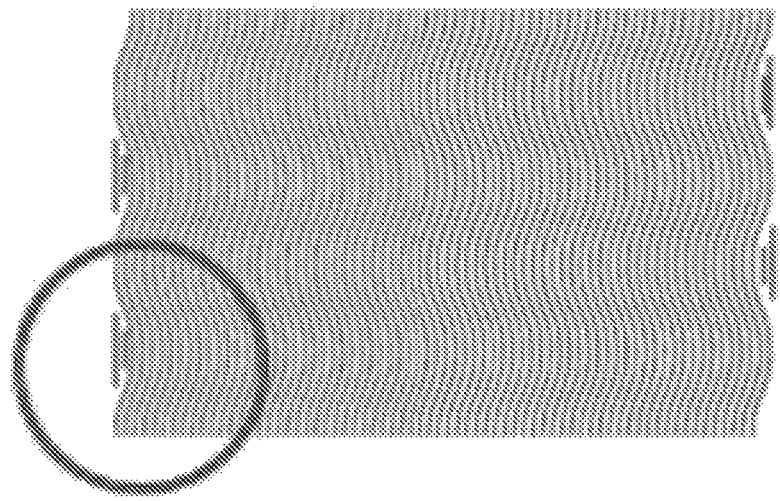
FIG. 27 shows another embodiment demonstrating planar deposit transition layers (circled) adjacent to the corrugated layers.
Figure 27:
Figure 27:
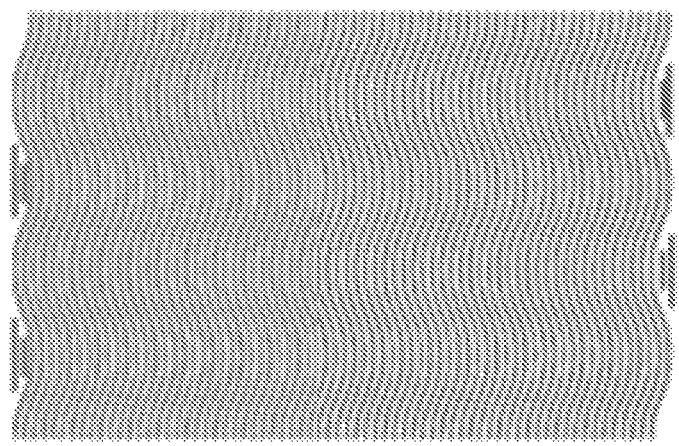

As shown in FIGS. 6-7, one or more transition layer(s) can be generated on top of the corrugation form. In some aspects, the transition layer(s) can be formed from planar layers generated on top of the corrugation form that collectively form the shape of the transition layer(s). FIG. 27 shows an embodiment demonstrating planar layers that form transition layers (circled) adjacent to the corrugated layers. In short, the transition layers do not have to extend the length of the corrugated layer but, as shown for example in FIG. 27, partially along the length of the corrugated layer with the result being a flat surface on the object. In some aspects, the method does not include generating the transition layer(s) and the corrugated layers are formed directly on the corrugation form as shown in FIG. 8. The breaks in the printing material in the corrugation form and/or base can be formed by starting and stopping deposition of the printing material or by a subtractive printing technique.

Continuing discussion of FIGS. 6-7, after the corrugated form, and in some aspects, the transition layer(s) have been generated, the first corrugated layer can be generated by directly depositing printing material on top of or otherwise forming a new layer on the corrugated form or base without breaks along the length of the printing material (see e.g., FIGS. 6-7). Deposition or formation of additional corrugated layers can continue by directly depositing or otherwise forming printing material on a previously formed corrugated layer or other layer and repeating such process as many times as desired. After the desired amount of corrugated layers have been generated, planar layers of printing material can be added directly on top of or otherwise formed on top of the last corrugated layer to form one or more transition layers. Planar layers can be used to fill in any indentations remaining from the transition layer(s) such that the outermost surface is substantially smooth (see e.g. FIG. 6).

Figure 9A:
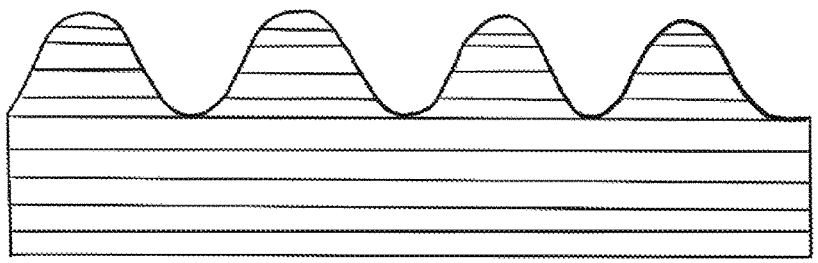
FIGS. 9A-9C show several views of one aspect of a corrugation form.
Figure 9B:
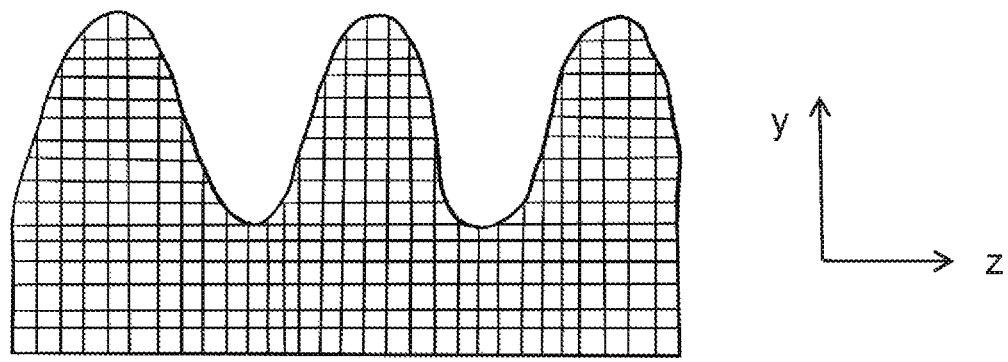
Figure 9C:
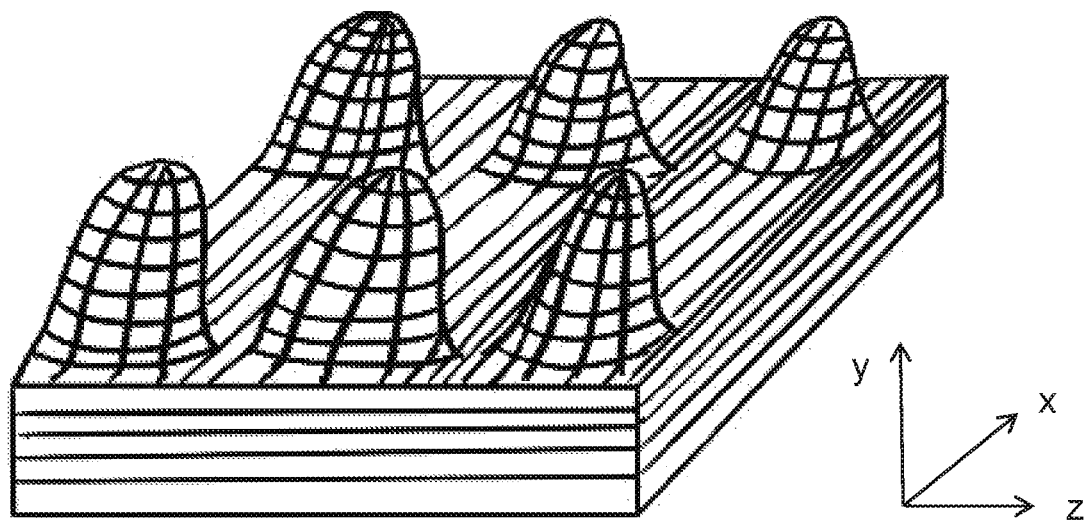
Figure 10:
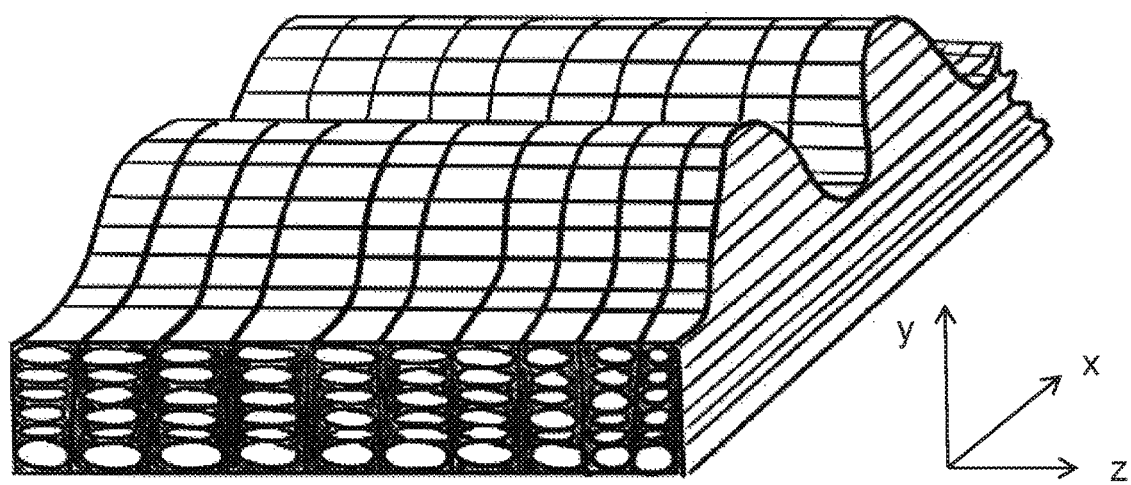
FIG. 10 shows another aspect of a corrugation form.

The corrugation from can be made of a substantially solid material that is not necessarily produced by a 3D-printing technique (see e.g. FIG. 8). In other aspects, the corrugation form can be made via 3D printing the corrugation form during production of the 3D object. The corrugation form can be part of the final 3D object or be removed during post-processing. The corrugation form can mimic the shape, and thus features, of the corrugated layer(s). FIGS. 9A-10 show various aspects of the corrugation form. While FIGS. 9A-10 show corrugation forms that have 3D printed layers, it will be appreciated that the same general structures and shapes can be present in a corrugation form that is solid. As shown in FIGS. 9A-9C, the corrugation form can be formed using planar layers to produce 3D features. As shown in FIG. 10 corrugation form can be formed using planar layers that produce essentially 2D features. While the 2D features in FIG. 10 are shown to exist in the x,y plane, it will be appreciated that the corrugation form can be configured such that the 2D features can exist in the x, z plane, in reference to the build direction, which is along the y-axis.

Figure 11:
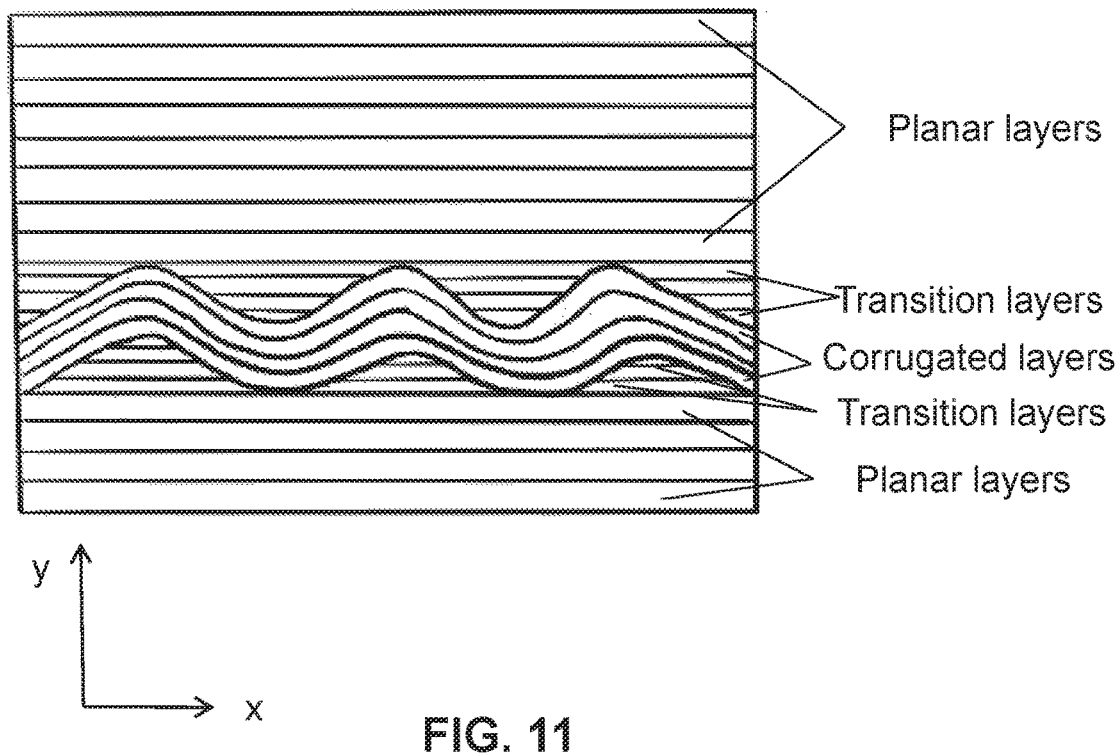
FIG. 11 shows a 2D view of the x, y plane of a section of an embodiment of a 3D object having one or more corrugated layers.

In other aspects, corrugated layers can be included without the formation of a corrugated form as previously described in relation to FIGS. 6-10. As shown in FIG. 11, generation of the object can begin with depositing printing material or otherwise forming planar layers. At a desired point, planar layers with breaks are formed so as to build in the shape of the corrugated layer. These planar layers with breaks can also be referred to as transition layers. As described anywhere herein, transition layers, no matter how formed or configured, are present to introduce the corrugation shape and/or features and/or gradually shift the layer being formed from a conventional planar layer to a corrugated layer. The corrugated layers can be generated by directly depositing printing material on top of or otherwise forming a new layer on the transition layer(s). After the desired number of corrugated layers are formed, one or more transition layers can be generated as shown in FIG. 11. Any number (including 0) of planar layers can then be generated on the last formed transition layer.

Figure 12:
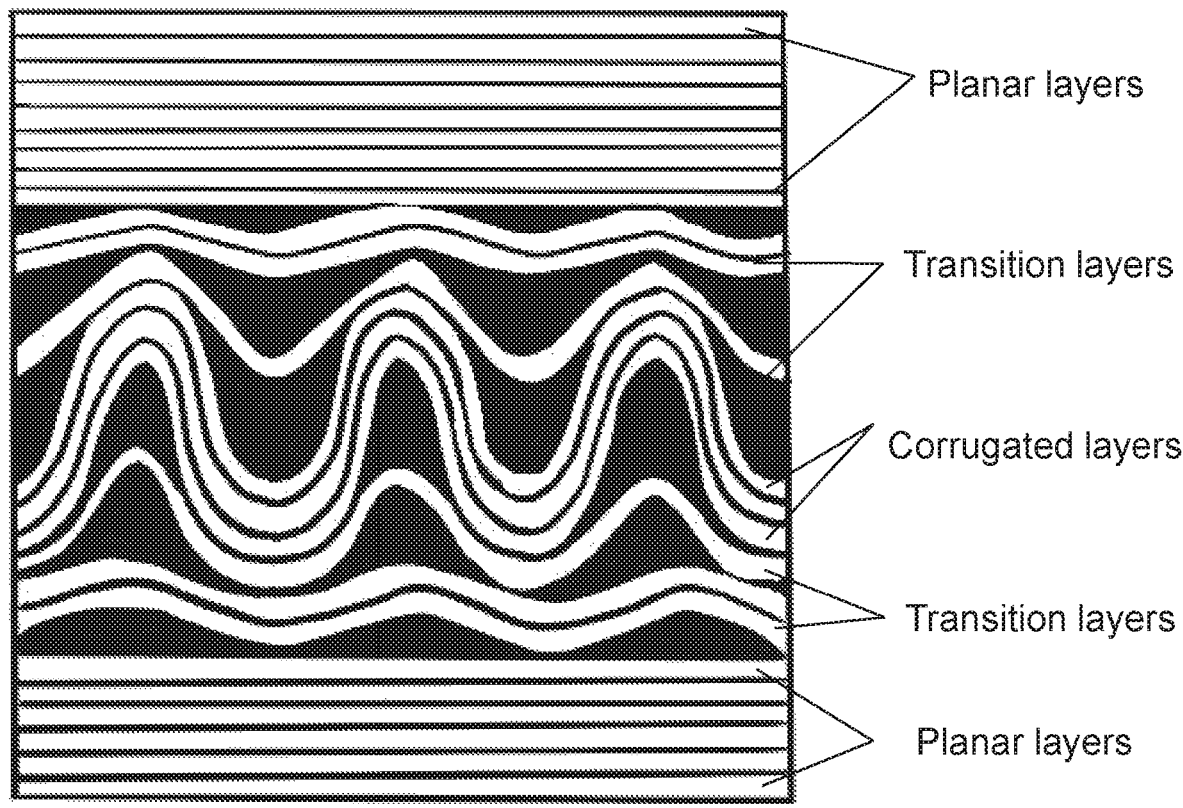
FIG. 12 shows a 2D view of the x, y plane of a section of an embodiment of a 3D object having one or more corrugated layers.
Figure 12:
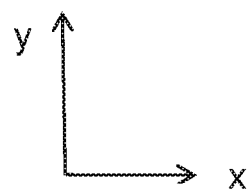
Figure 13:
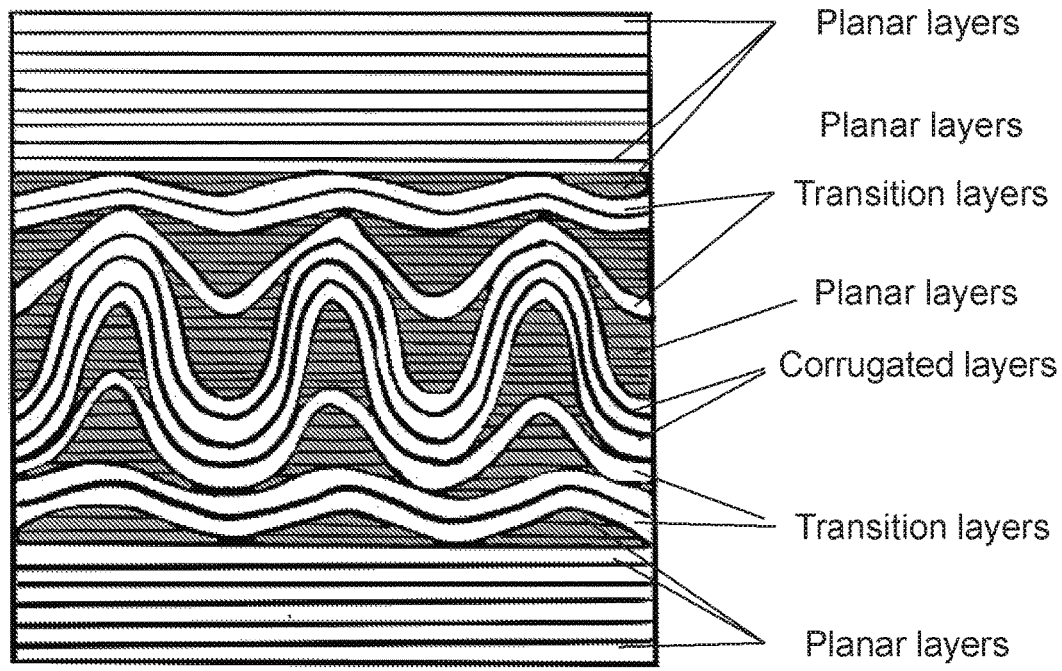
FIG. 13 shows a 2D view of the x, y plane of a section of an embodiment of a 3D object having one or more corrugated layers.

As shown in FIGS. 12-13, in yet further aspects, one or more corrugated transition layers can be generated to introduce corrugated layers into the 3D object. The corrugated transition layers can include features that, when considered collectively, gradually introduce the corrugated features into the 3D object. Stated differently, the corrugated transition layer(s) include one or more features that can be a degree less in size and/or a degree different in shape and/or position along an axis relative to features in a corrugated layer. In other words, the features of a corrugated transition layer can have the same or different characteristics as any feature of another corrugated transition layer or corrugated layer. As shown in FIG. 12, voids or holes in the object can result between a corrugated transition layer, a planar layer, and/or a corrugated layer. In some aspects, one or more of the voids can be filled in during post-processing using a suitable material. In some aspects, one or more of the voids can be left as a void or hole. As shown in FIG. 13, the voids can be filled in, such as during 3D printing of the 3D object, with planar layers.

With respect to any transition layer described herein, there can be one or more transition layers on one or both sides of the corrugated layer(s). The number of transition layers can range from 1 to 5, 10, 15, 20, 30, 40, 50, 60, 70, 80, 90, 100, 125, 150, 175, 200, 250, 500, 1000 or more. In this way, the transition layers can each be varied to allow for a gradual transition, be greatly contrasted to allow for a rapid but steep transition from planar to the desired corrugation, and anywhere in between as desired.

The 3D objects produced can contain one or more regions that contain one or more corrugated layers, one or more transition layers, and/or one or more corrugation forms. In some aspects, the method can produce 3D objects that have sections that contain corrugated layers that are separated by sections of planar layers, transition layers, and/or corrugation forms. Thus, any 3D object can have regions that can be more shear resistant than others. This can be useful, for example, where only certain areas of the object are subjected to shear forces and/or where it is desirable that the amount of material used is minimized.

Figure 14:
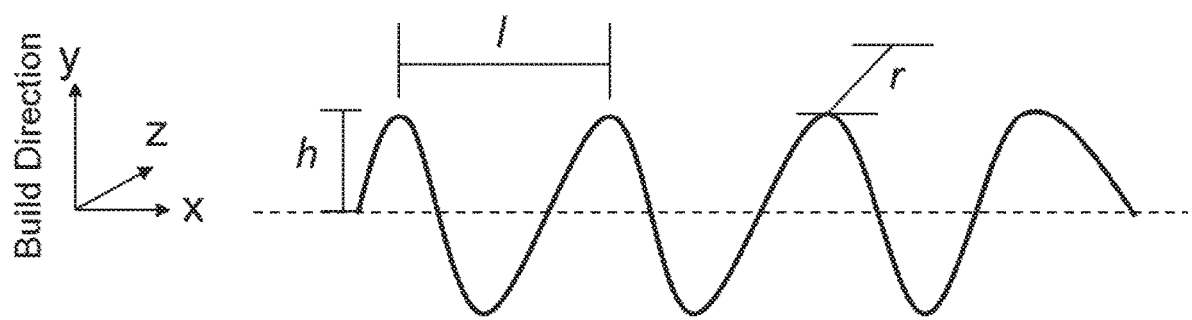
FIG. 14 shows a cartoon demonstrating the various characteristic measurements of a corrugated layer and its features.
Figure 15A:
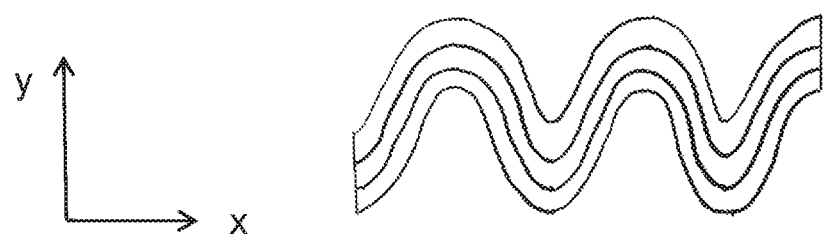
FIGS. 15A-15F show various aspects of a corrugated layer and exemplary embodiments of the features of a corrugated layer.
Figure 15B:
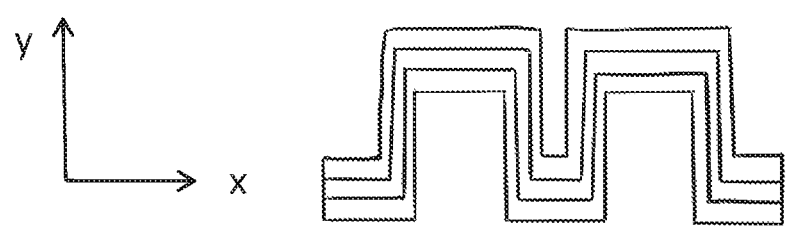
Figure 15C:
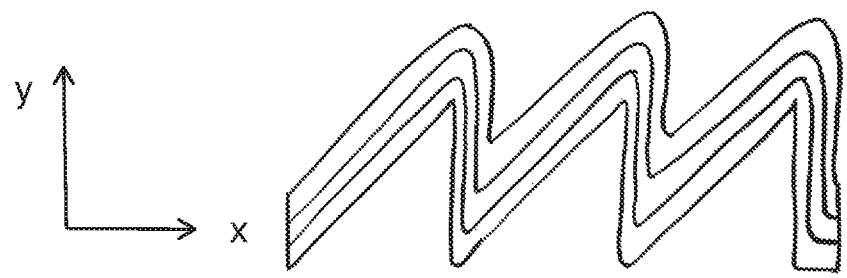
Figure 15D:
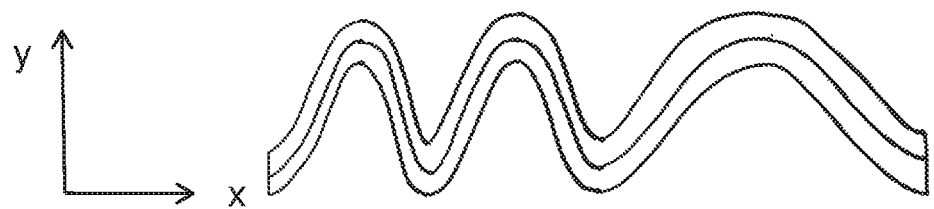
Figure 15E:
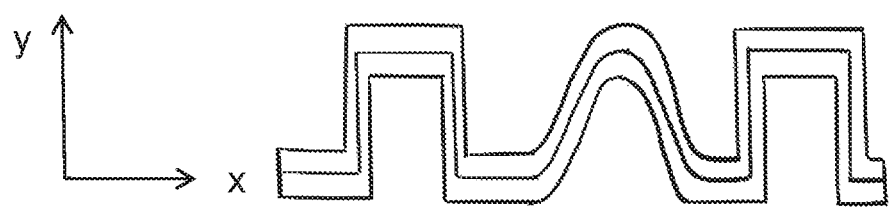
Figure 15F:
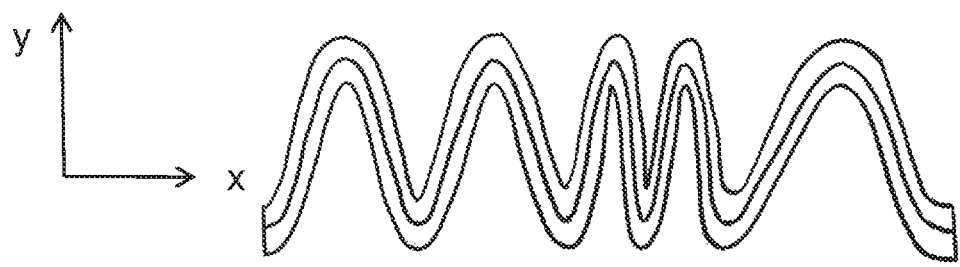

With an understanding of the 3D objects containing a corrugated layer having corrugated features (also referred to herein as features) and methods of 3D printing such objects in mind, attention is directed to FIG. 14, which shows various aspects of a corrugated layer. When discussing the corrugated layers, it will be appreciated that they can extend along the length of an axis (also referred to herein as the primary axis) and contain features that extend along a different axis (also referred to herein as the secondary axis). Thus, any corrugated layer can exist in a single plane. The corrugated layer shown in FIG. 14 can be referred to as an x,y corrugated layer as the corrugated layer exists in the x,y plane with the layer extending along the x-axis and the features of the extending along the y-axis. It will be appreciated that the corrugated layer can have planarity in the x,y, y,x, x,z, z,x, z,y, or y,z, planes. It will also be appreciated that the build direction is not always along the y-axis depending on the type of additive and/or subtractive manufacturing process and/or 3D printer used, for example. The corrugated layer and features thereof can be formed from a layer of printing material deposed or otherwise formed by a 3D printing machine.

As shown in FIG. 14, the features can have a length (l), which is the distance between the middle of a first feature to the middle of a second feature as measured along the primary axis. The length of each feature in a corrugated layer can be the same or about the same. In some aspects, the length of at least two features in a corrugated layer can be the same or about the same. In some aspects, the length of at least two features can be different from each other. In some aspects, the length of each of the features in a corrugated layer are different from each other. It will be appreciated that the length can be any length as practical with the 3D object being made. In some aspects, the height can range from 0.01 mm to 10 meters or more or any range therein.

As shown in FIG. 14, the features can have a height (h), which is the distance the features extend away from the secondary axis in the positive and/or negated direction relative to the secondary axis. The height (h) of the features extending away from the secondary axis in the positive direction, in some aspects, is the same as the height (h) of the features extending away from the secondary axis in the negative direction. The height (h) of the features extending away from the secondary axis in the positive direction, in some aspects, is not the same as the height (h) of the features extending away from the secondary axis in the negative direction. In some aspects, the height (h) of at least one of the features extending in the positive direction along the secondary axis can be the same as the height (h) as at least one of the features extending in the negative direction along the secondary axis. In some aspects, the height (h) of at least one of the features extending in the positive direction along the secondary axis can be different from the height (h) of at least one of the features extending in the negative direction along the secondary axis. It will be appreciated that the height can be any height as practical with the 3D object being made. In some aspects, the height can range from 0.01 mm to 10 meters or more or any range therein.

As shown in FIG. 14, the corrugated layer can have a roll (r), which is the maximal distance the features deviate away from the secondary axis towards the tertiary axis. The tertiary axis is the axis where the corrugated layer does not have planarity. For example and as shown in FIG. 10, the tertiary axis is the z-axis. The roll (r) of the corrugated layer can be the same or about the same along the entire layer. In some aspects, the roll (r) of a corrugated layer can be varied along the length of the corrugated layer. In some aspects the roll can be any degree from 0 to 180 degrees and can range from any range therein. It will be understood that the features can be 2D or form 3D structures in the 3D object.

A transition layer, such as a corrugated transition layer, can be configured the same way as a corrugated layer, with the difference between the two types of layers being that the corrugated layer has the end-point desired feature characteristics, while the transition layer is configured to break up the change between a planar layer, which does not contain features, and the corrugated layer(s). Thus, the transition layer(s), like the corrugated layer can have features that can have a length as described above, a height as described above, and a roll as described above with respect to the corrugated layer(s), but to a lesser degree as compared with the corrugated layer(s). Similarly, the transition layers can be used to gradually change the shape of the features of one area of corrugated layers to another area of corrugated layers that can have features of a different shape. The features can be irregularly or regularly (periodically) positioned along a given axis. The features can be the same size and/or shape along a corrugated layer. In some aspects, at least one feature is a different size and/or shape along a corrugated layer. In some aspects, at least two features are the same size and/or shape along a corrugated layer.

The feature of the corrugated layers (and also transition layer(s) and/or corrugation forms) can be any shape or size as desired. In some aspects, the corrugated layers can be wave-like and have the general shape of a wave. In other aspects, the features in a corrugated layer can be configured such that the corrugated layer forms a sine wave, sawtooth wave, square wave, or a triangle wave. The length and height of the features can be such that the wave can be periodic or irregular. The features of the wave-like corrugated layer can be configured such that the wave-like corrugated layer can contain a single wave type and/or wave characteristics along its length. The features of the wave-like corrugated layer can be configured such that the wave-like corrugated layer can contain different wave types and/or wave characteristics along its length. Thus, for example, a single corrugated layer can be sine wave-like, square wave-like, sawtooth wave-like, triangle wave-like, or any combination thereof. FIGS. 15A-15F show various examples of corrugated layers within a 3D physical object. Other shapes and variations will be appreciated by the skilled artisan in view of this description and are within the scope of this disclosure.

Figure 23:
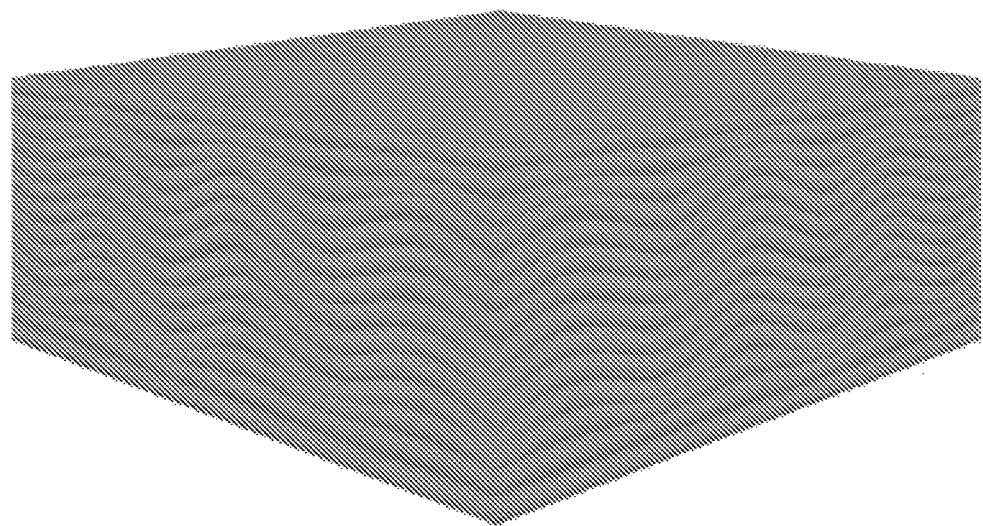
FIG. 23 shows another aspect of a 3D object having one or more corrugated layers.
Figure 23:
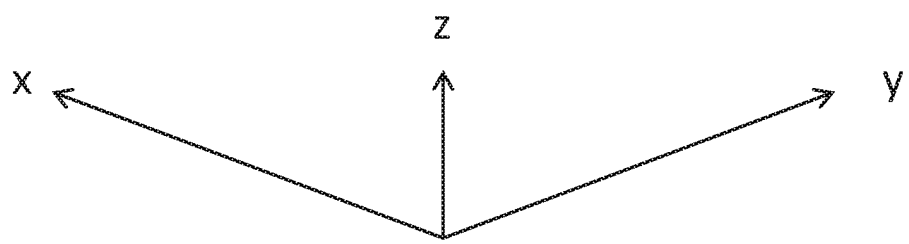
Figure 24A:
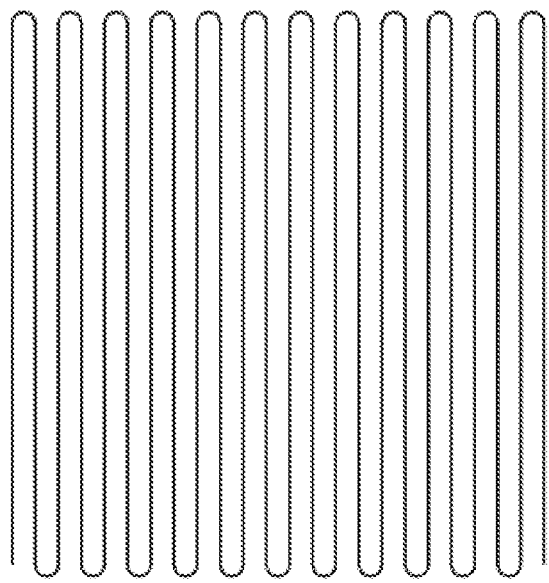
FIGS. 24A-24B show various aspects of the deposition patterns of various layers (planar, corrugated, and/or transition layers) that can be incorporated into a 3D object.
Figure 24B:
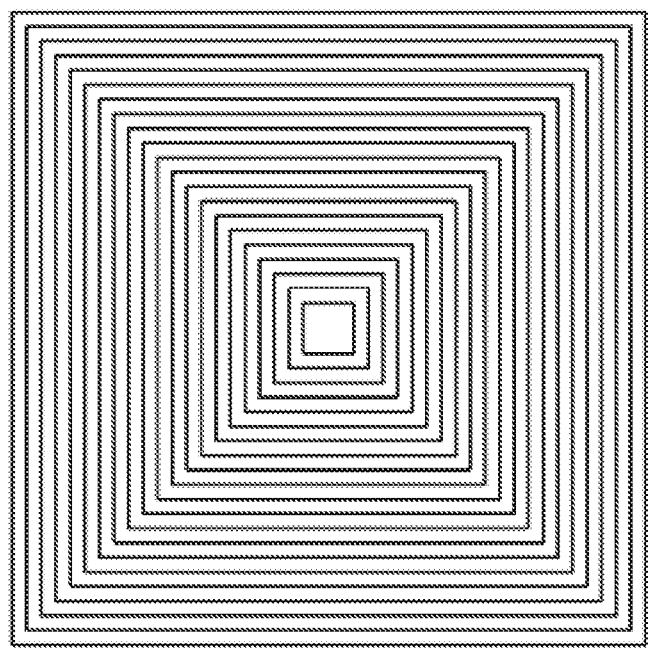

As shown in FIG. 23, the corrugated layers can be deposited such that the corrugated layers extend along two axis. In FIG. 23, for example the corrugated layer(s) can be deposited such that the length runs along a first axis (e.g. the x-axis in FIG. 23) and then a change of deposition direction can result in a change in the corrugated layer(s) such that their length then runs along a second axis (e.g. the y-axis in FIG. 23). FIG. 24B shows a deposition pattern that can result in the corrugated layer(s) shown and described in FIG. 23. FIG. 24A shows another deposition pattern that can be used to form the corrugated, transition, and/or planar layers described herein.

Figure 25:
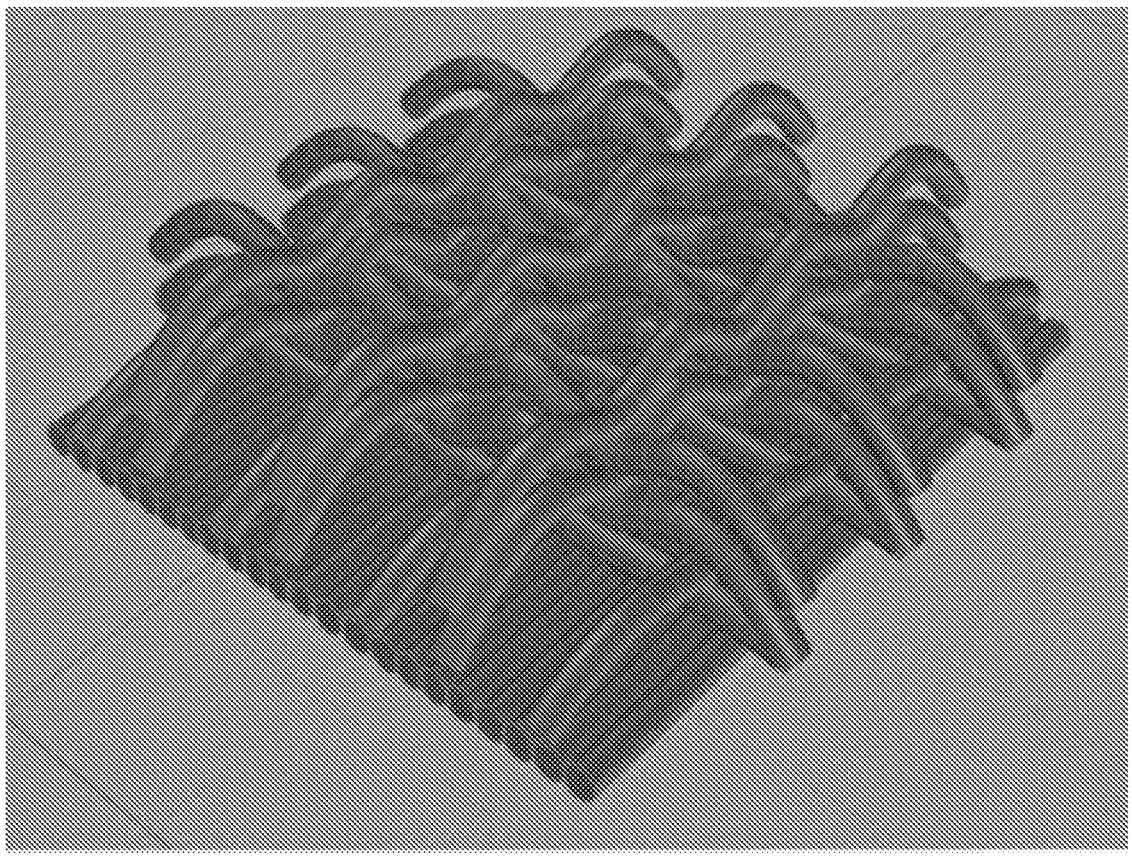
FIG. 25 shows aspects of a 3D object that can include corrugated layers configured in a cross-hatch pattern, wherein corrugated layers applied along different axes are alternated in deposition to form the cross-hatch pattern.
Figure 25:
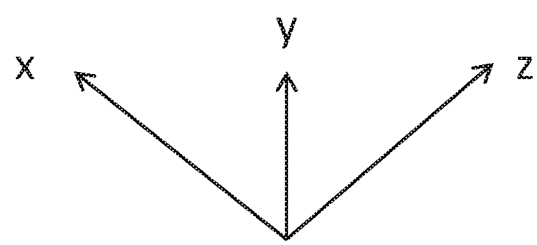

FIG. 25 shows another aspect of the corrugated layers described herein. As shown in FIG. 25, one or more first corrugated layers can be deposited, where the first corrugated layer is as described elsewhere herein. The length of the first corrugated layer can extend along a first axis (e.g. the x-axis in FIG. 25). After depositing the one or more first corrugated layers, one or more second corrugated layers can be deposited on top of the first corrugated layers. The length of the one or more second corrugated layers can extend along a second axis (e.g. the z-axis in FIG. 25). Any number of additional layers of corrugated layers can be deposited in this manner where the axis along which the length of the layer extends is alternated every other, every third, $4^{th}$ $5^{th}$, $6^{th}$, $7^{th}$, $8^{th}$, $9^{th}$, $10^{th}$, $11^{th}$, corrugated layer. FIG. 25 demonstrates a 3D object where the axis is alternated every other corrugated layer, such that the length of the third corrugated layer(s) extends along the same axis as the one or more first corrugated layers. This forms a cross-hatch feature in the object. The cross-hatch feature formed by the corrugated layers can add strength and/or flexibility to the 3D object or section thereof. Transition and/or planar layers can be incorporated within the corrugated layers forming a cross-hatch as described elsewhere herein with respect to the corrugated layers. Any 3D object, including those with other corrugated layers as described elsewhere herein, can contain one or more areas that are cross-hatched corrugated layers. The different sections can be separated from one another by one or more transition and/or planar layers as described elsewhere herein.

Any suitable additive or combination of additive and subtractive manufacturing techniques can be employed to generate the corrugated layers and 3D physical objects containing one or more corrugated layers. Suitable additive or combination additive/subtractive manufacturing techniques, include but are not limited to FFF, SLA, DLP, SLS, material jetting (including PolyJet printing and MultiJet Modeling), binder jetting, liquid deposition modeling (LDM), paste extrusion deposition, (PED) 3D metal printing processes (including selective laser melting and electron beam melting). Other suitable manufacturing techniques will be appreciated by those of skill in the art in view of this description and are within the scope of this disclosure. Any suitable 3D printing device can be used to implement the methods and generate the corrugated layers as described herein. Suitable printing devices include, but are not limited to, FFF, SLA, DLP, SLS, polyjet material, printers, and robotic arms.

Any suitable printing materials can be used to generate the 3D objects that can contain one or more corrugated layers as described herein, and/or printing support structures and/or used during post-processing. Suitable printing materials include, but are not limited to, polymers, ceramics, metals and metal alloys, wood, carbon fiber, lignins and concretes. Suitable polymers can include, but not limited to, thermoplastics (e.g. thermoplastic elastomer (TPE) (e.g. thermoplastic polyurethane (TPU)), acrylonitrile butadiene styrene (ABS), polycarbonate (PC), ABS-M30, ABSplus, ABS-ESD7, ABS-M30i, PC-ABS, PC-ISO, ULTEM 9085, polyphenylsulfone (PPSF/PPSU), nylon (e.g. Nylon 12) and other thermoplastic blends)), and other polymers, which can be or are not thermoplastic, polyethylene terephthalate (PET), PETG (blend of PET and Glycerol, a.k. Amphora AM18000), Amphora AM3300, thermoplastic copolyester (TPC)), polylactic acid (PLA), polyamide (PA), high impact polystyrene (HIPS), polyvinyl alcohol, wood-polymer blends, polyethylene coterephthalate (PETT), acrylonitrile styrene acrylate, polypropylene, polyoxymethylene, polymethyl methacrylate (PMMA or acrylic), chalk-polymer blends (e.g. chalk/co-polyester blends), PORO-LAY material, and Flexible PolyEster (FPE). Suitable ceramics can include, but are not limited to, LAYCeramic material, clays, glass-ceramic composite materials, Porecelite Ceramic resin, Tethonite ceramic powder, Sculpteo Printing Ceramic, clay-polymer blends, polymer-metal blends (e.g. ColorFab material, ProtoPasta material, and Tree D filaments), and ceramic-polymer blends. Suitable metals and metal alloys include, but are not limited to, titanium, aluminum, gold, silver, copper, iron, steel, platinum, bronze, brass, and alloys thereof. Suitable concrete materials include, but are not limited to, wet and dried forms of cement, cement-polymer blends, binders, concrete, and concrete-polymer blends. Other suitable materials will be appreciated by those of ordinary skill in the art in view of this description and are within the scope of this disclosure.

The additive manufacturing methods and corrugated layers described herein can be included in any additive manufacturing technique on any scale. For example, they can be used to produce any article of manufacture as well as be used in large-scale construction projects, such as buildings, walls, and other structures. One of ordinary skill in the art will appreciate such additive manufacturing techniques. The additive manufacturing methods and corrugated layers described herein can be used to produce or in any 3D object on any scale. They can be used in any industry, including but not limited to, aerospace, automotive, construction, rapid-prototyping, art, electronics, product manufacturing.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Figure 16A:
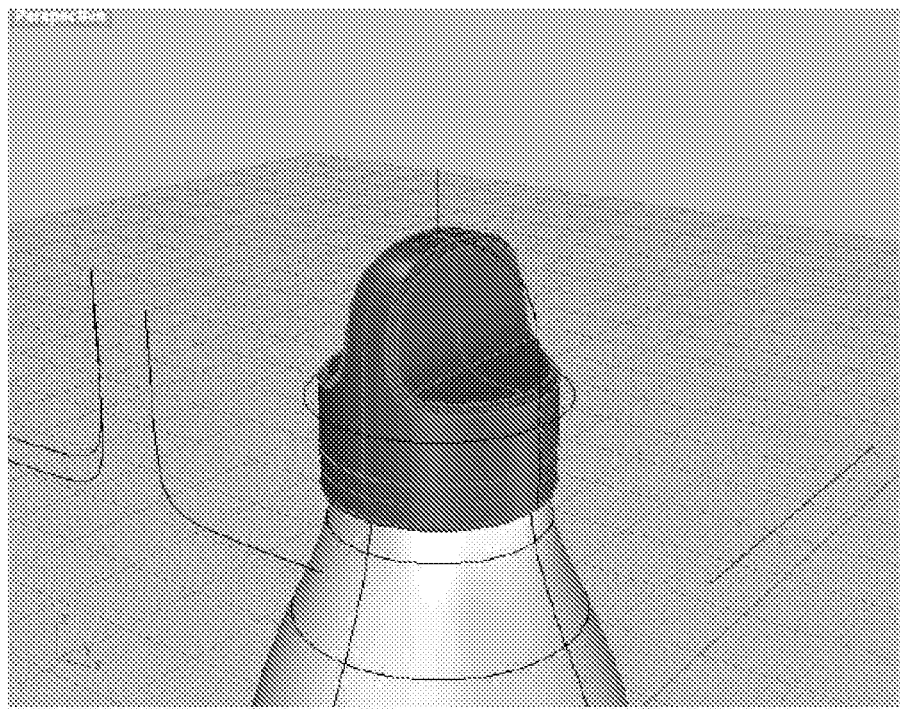
FIGS. 16A-16C show exemplary CAD designs of a 3D object.
Figure 16B:
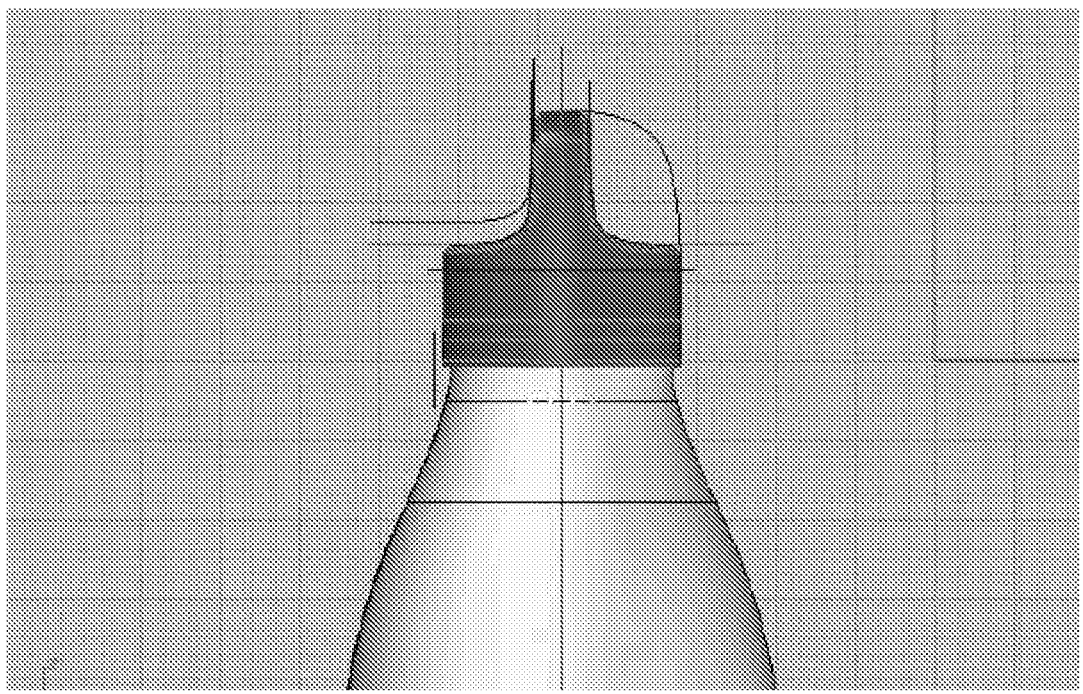
Figure 16C:
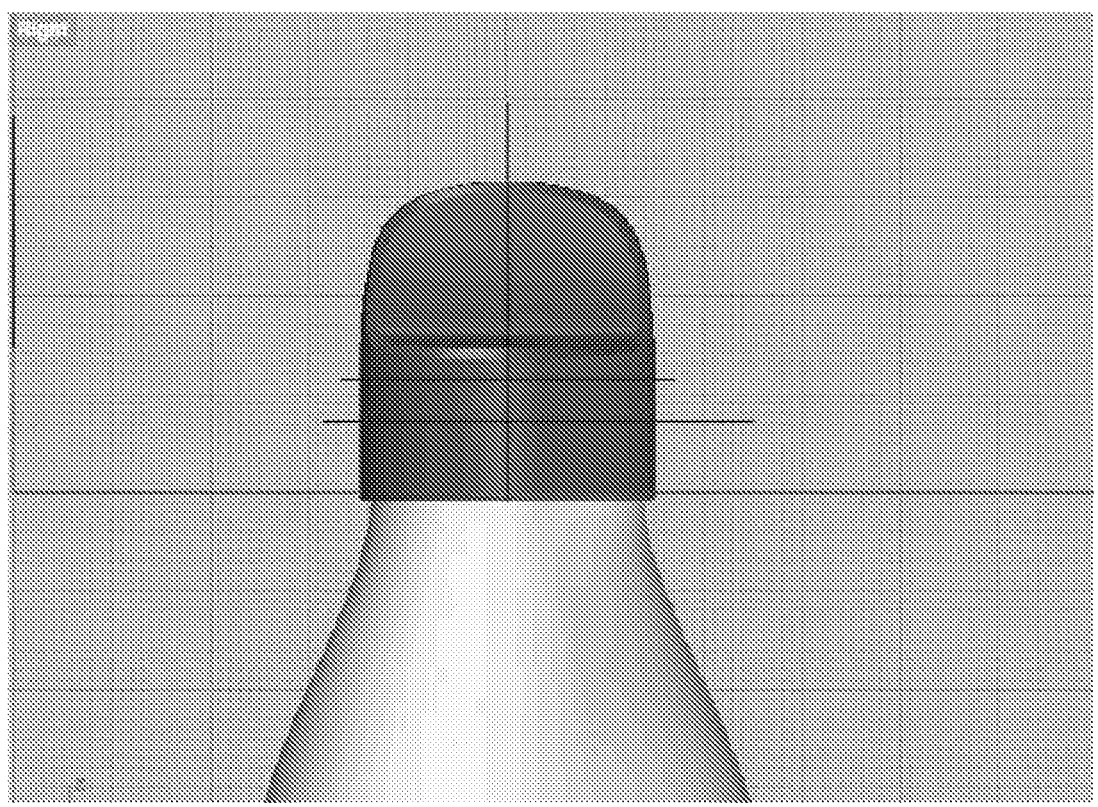
Figure 17:
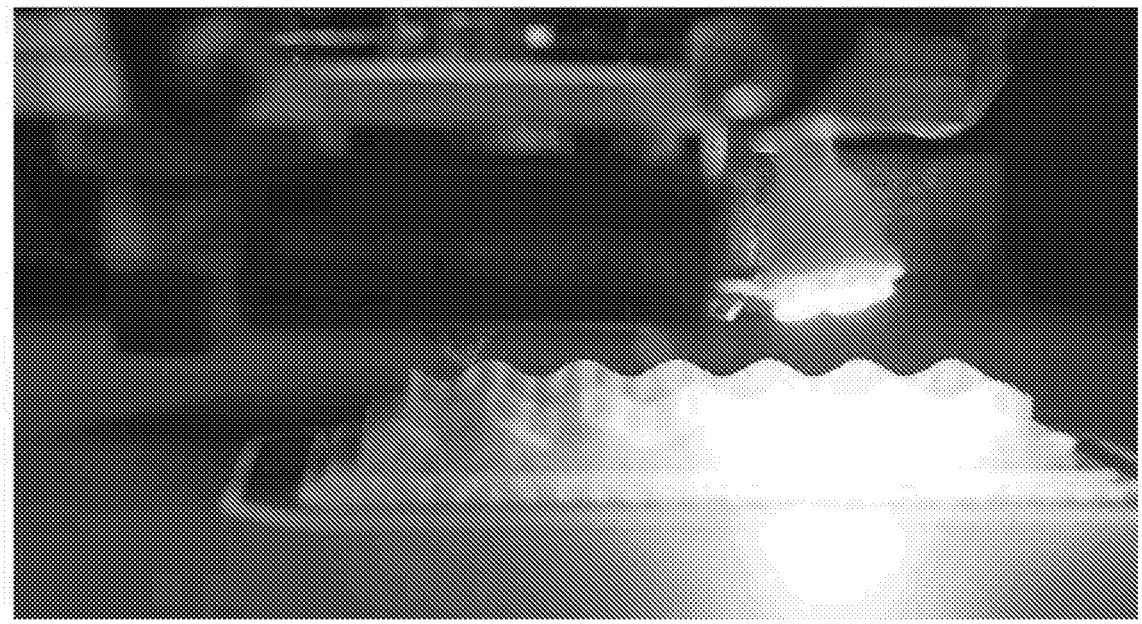
FIG. 17 shows an image that can demonstrate the fused filament fabrication (FFF) printing of a 3D object having one or more corrugated layers.
Figure 18:
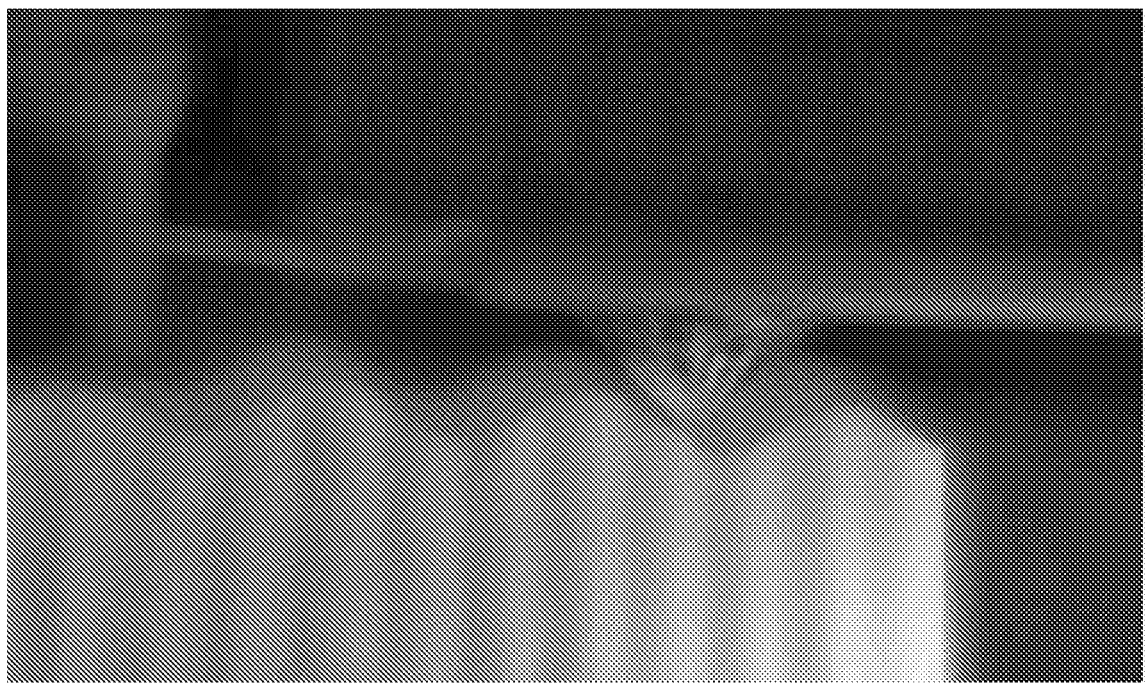
FIG. 18 shows an image that can demonstrate the FFF printing of a 3D object having one or more corrugated layers.
Figure 21A:
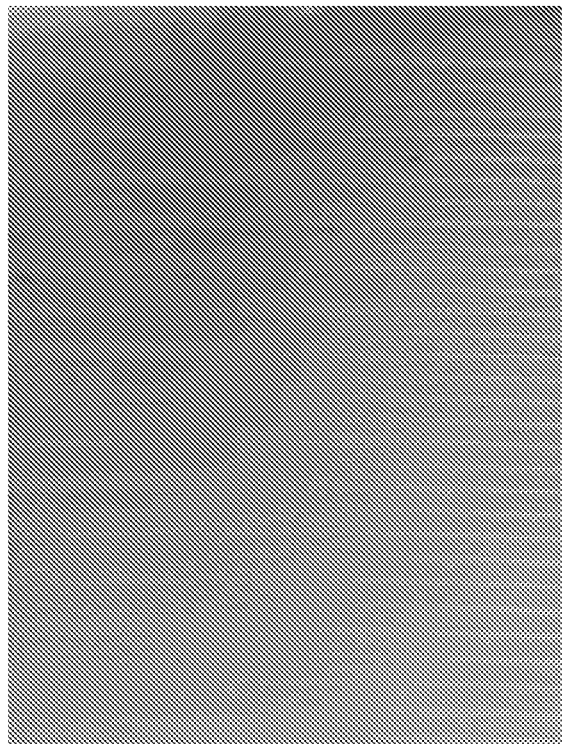
FIGS. 21A-21B show close-up images of conventional planar layers (FIG. 21A) and corrugated layers (FIG. 21B) in a 3D object that can be made using additive manufacturing.
Figure 21B:
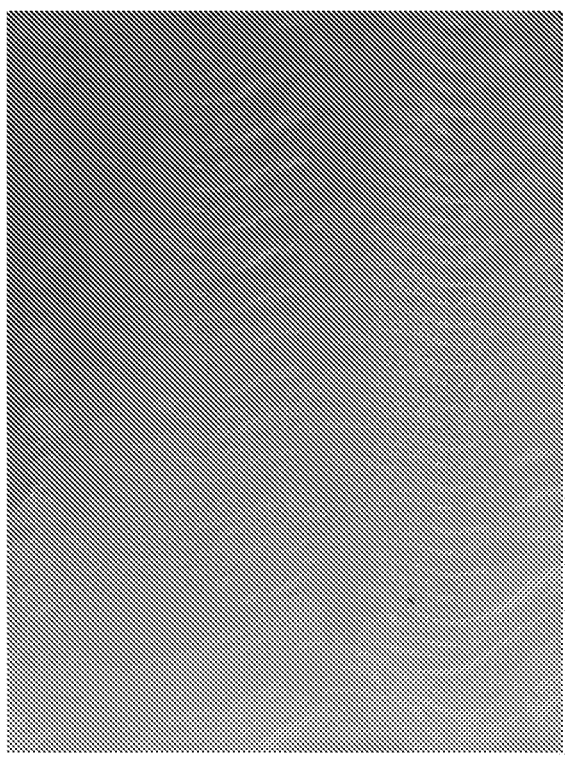
Figure 22A:
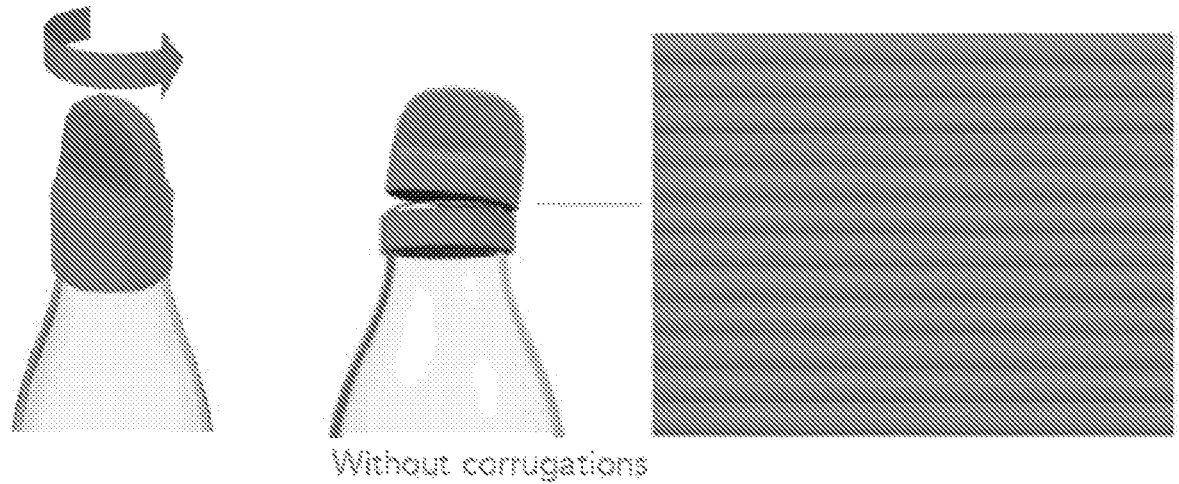
FIGS. 22A-22B show images that can demonstrate the effect of including one or more corrugated layers in a 3D object on the resistance to shear forces on the 3D object.
Figure 22B:
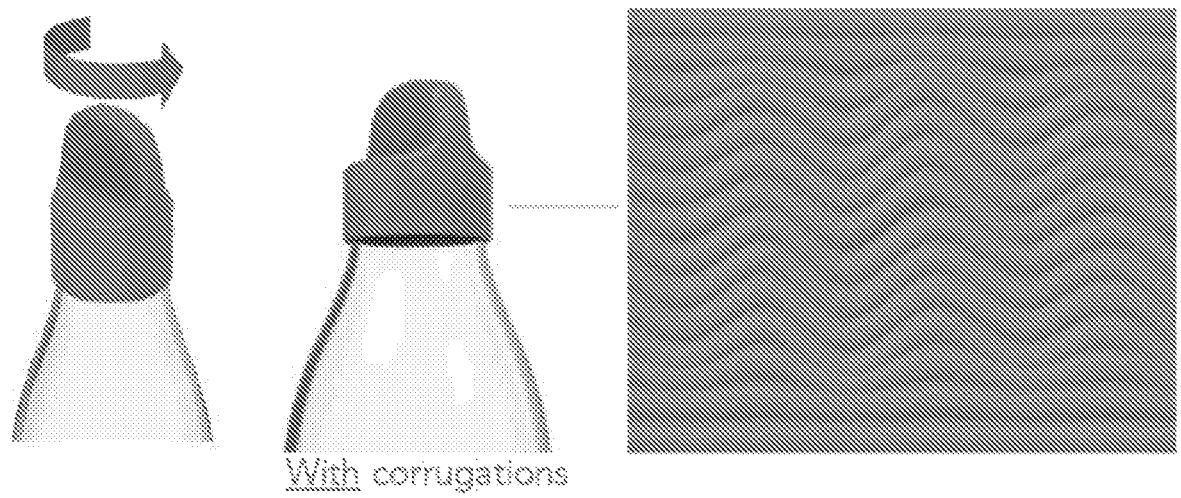

3D objects having corrugated layers were generated using a FFF 3D printing technique. Briefly, a CAD program (Solidworks) was used to design the 3D objects to be built. FIGS. 14A-14C show representative images of the CAD of a 3D object. After the CAD of the 3D object, the CAD file was imported into a suitable slicing program and the desired slices and infilling (by planar layers or otherwise) to incorporate the corrugated layers were designed. The resulting sliced file was then transferred to a 3D printer and the 3D object was printed. FIGS. 15-16 show images of the production of a 3D object with corrugated layers using 3D printing. FIG. 17 shows an image of a 3D object with corrugated layers made by 3D printing. FIGS. 18A-18B show images of a bottle top with (FIG. 18A) and without (FIG. 18B) corrugated layers. FIGS. 19A-19B show close-up images of conventional planar layers (FIG. 19A) and corrugated layers (19B). The resulting 3D object having corrugated layers can be resistive to shear forces and thus be stronger than conventional 3D printed objects (see e.g., FIGS. 20A-20B).

We claim:

1. A method of additive manufacturing, the method comprising:
    forming an object comprising a plurality of laminated corrugated layers of material using a three-dimensional (3D) printer, wherein each of the corrugated layers of the plurality of laminated corrugated layers has a thickness, a length, a width, a height, and a roll ranging from 0 degrees to 180 degrees, wherein the roll of one or more corrugated layers of the plurality of laminated corrugated layers is varied along the length of the one or more corrugated layers,
    wherein each corrugated layer of the plurality of corrugated layers has a cross-sectional area defined by the thickness and width at any given point along the length of the corrugated layer, wherein the cross sectional area of each corrugated layer of the plurality of laminated corrugated layers is substantially the same, and wherein the cross-sectional area of each corrugated layer of the plurality of laminated corrugated layers is substantially constant along the entire length of each of the corrugated layers, and
    wherein each corrugated layer varies in height along the length of the corrugated layer, and wherein the height of each corrugated layer at a position along the length of the corrugated layer is greater than the height of a planar layer that can be formed using the 3D printer having the same thickness and width as the corrugated layer, wherein the height of the corrugated layer is measured along the build direction of the 3D printer.

2. The method of claim 1, wherein the roll of one or more corrugated layers of the plurality of laminated corrugated layers ranges from any degree greater than zero degrees to 180 degrees.

3. The method of claim 1, further comprising forming a first transition layer of material using the 3D printer, wherein the first transition layer has a thickness, a length, a width, and a height,
    wherein the first transition layer of material has a cross-sectional area defined by the thickness and the width of the first transition layer at any given point along the length of the first transition layer,
    wherein the height of the first transition layer varies along the length of the first transition layer,
    wherein the height of the first transition layer at a position along the length of the first transition layer is greater than the height of a planar layer that can be formed using the 3D printer having the same thickness and width as the first transition layer, and
    wherein the height of the first transition layer is less than the height of the corrugated layer when measured at the same position along the length of the first transition layer and the corrugated layer.

4. The method of claim 3, wherein the first transition layer is adjacent to the corrugated layer.

5. The method of claim 3, further comprising the step of forming a second transition layer using the 3D printer, wherein the second transition layer has a thickness, a length, a width, and a height,
    wherein the second transition layer of material has a cross-sectional area defined by the thickness and the width of the second transition layer at any given point along the length of the second transition layer,
    wherein the height of the second transition layer varies along the length of the second transition layer,
    wherein the height of the second transition layer at a position along the length of the second transition layer is greater than the height of a planar layer that can be formed using the 3D printer having the same thickness and width as the second transition layer,
    wherein the height of the second transition layer is less than the height of the corrugated layer when measured at the same position along the length of the first transition layer and the corrugated layer, and
    wherein the height of the second transition layer is greater than the height of the first transition layer when measured at the same position along the length of the second transition layer and the first transition layer.

6. The method of claim 5, wherein (a) the first transition layer is adjacent to the second transition layer, (b) the second transition layer is adjacent to the corrugated layer, or both (a) and (b).

7. The method of claim 1, wherein at least two or more corrugated layers plurality of laminated corrugated layers are positioned along different axes relative to each other so as to form a crosshatch.

8. The method of claim 3, wherein the step of forming the first transition layer comprises depositing material on a corrugation form,
    wherein the corrugation form has a height, length, width, and thickness,
    wherein the corrugation form has a cross-sectional area defined by the width and thickness of the corrugation form,
    wherein the corrugation form varies in height along the length of the corrugation form, and
    wherein the variation in height along the length of the corrugation form is substantially the same as the variation in height along the length of the first transition layer.

9. The method of claim 5, wherein (a) the cross-sectional area of the first transition layer is substantially constant along the length of the first transition layer,
    (b) the cross-sectional area of the first transition layer varies along the length of the first transition layer,
    (c) the cross-sectional area of the second transition layer is substantially constant along the length of the second transition layer, (d) the cross-sectional area of the second transition layer varies along the length of the second transition layer,
(a) and (c),
(a) and (d),
(b) and (c), or
(b) and (d).

10. The method of claim 5, wherein the second transition layer is a planar layer.

11. The method of claim 8, wherein the corrugation form is comprised of planar layers.

12. The method of claim 8, wherein the corrugation form is a non-laminate material.

13. The method of claim 1, wherein the method of additive manufacturing is fused filament fabrication.

14. The method of claim 1, wherein forming an object comprises depositing a corrugated layer directly on a corrugated form, wherein the corrugated form comprises a plurality of discrete groups of planar layers, wherein the planar layers of each group form are each a different length along a first axis, wherein the planar layers in a group are stacked upon each other in decreasing size order with the longest planar farthest away from the corrugated layer and the shortest planar layer closest to the corrugated layer.

15. The method of claim 1, wherein the plurality of corrugated layers are formed in a radial pattern.

16. A method of additive manufacturing, the method comprising:
forming an object comprising a plurality of laminated corrugated layers of material using a three-dimensional (3D) printer, wherein each of the corrugated layers of the plurality of laminated corrugated layers has a thickness, a length, a width, a height, and wherein one or more of the corrugated layers of the plurality of corrugated layers has a roll ranging from any degree greater than 0 to 180 degrees,
wherein each corrugated layer of the plurality of corrugated layers has a cross-sectional area defined by the thickness and width at any given point along the length of the corrugated layer, wherein the cross sectional area of each corrugated layer of the plurality of laminated corrugated layers is substantially the same, and wherein the cross-sectional area of each corrugated layer of the plurality of laminated corrugated layers is substantially constant along the entire length of each of the corrugated layers, and
wherein each corrugated layer varies in height along the length of the corrugated layer, and wherein the height of each corrugated layer at a position along the length of the corrugated layer is greater than the height of a planar layer that can be formed using the 3D printer having the same thickness and width as the corrugated layer, wherein the height of the corrugated layer is measured along the build direction of the 3D printer,
wherein the roll of the one or more layers is varied along the length of the one or more corrugated layers.

17. The method of additive manufacturing of claim 16, wherein each of the corrugated layers has a roll ranging from any degree greater than 0 to 180 degrees.

18. The method of additive manufacturing of claim 16, at least two or more corrugated layers plurality of laminated corrugated layers are positioned along different axes relative to each other so as to form a crosshatch.

* * * * *